(12) United States Patent
Zaghib et al.

(10) Patent No.: US 10,954,351 B2
(45) Date of Patent: Mar. 23, 2021

(54) APROTIC POLYMER-MOLTEN SALT-SOLVENT TERNARY COMPOSITION, METHOD FOR THE PREPARATION AND USE THEREOF IN ELECTROCHEMICAL SYSTEMS

(71) Applicant: HYDRO-QUÉBEC, Montreal (CA)

(72) Inventors: Karim Zaghib, Longueuil (CA); Patrick Charest, Ste-Julie (CA); Abdelbast Guerfi, Brossard (CA); Martin Dontigny, Sainte Julie (CA); Michel Peticlerc, Notre-Dame-du-Mont-Carmel (CA)

(73) Assignee: HYDRO-QUÉBEC, Montréal (CA)

( * ) Notice: Subject to any disclaimer, the term of this patent is extended or adjusted under 35 U.S.C. 154(b) by 0 days.

(21) Appl. No.: 15/652,900

(22) Filed: Jul. 18, 2017

(65) Prior Publication Data
US 2018/0155513 A1 Jun. 7, 2018

Related U.S. Application Data

(63) Continuation of application No. 11/576,940, filed as application No. PCT/CA2005/001553 on Oct. 11, 2005, now abandoned.

(30) Foreign Application Priority Data

Oct. 12, 2004 (CA) ................. CA 2482003

(51) Int. Cl.
*C08J 5/22* (2006.01)
*G02F 1/1523* (2019.01)
(Continued)

(52) U.S. Cl.
CPC ............. *C08J 5/2268* (2013.01); *C08J 3/095* (2013.01); *G02F 1/1525* (2013.01); *H01B 1/122* (2013.01);
(Continued)

(58) Field of Classification Search
None
See application file for complete search history.

(56) References Cited

U.S. PATENT DOCUMENTS 5,484,670 A 1/1996 AnQell et al.
5,643,490 A 7/1997 Takahashi et al.
(Continued)

FOREIGN PATENT DOCUMENTS

CA 2 471 395 A1 7/2003
CA 2 411 695 A1 5/2004
(Continued)

OTHER PUBLICATIONS

International preliminary Report on Patentability.
(Continued)

*Primary Examiner* — Robert S Carrico
(74) *Attorney, Agent, or Firm* — Buchanan Ingersoll & Rooney P.C.

(57) ABSTRACT

An aprotic polymer/molten salt ternary mixture solvent and to a corresponding quaternary mixture additionally including an ionic conducting salt, which are prepared by mixing the constituents of the mixture. These mixtures are advantageously used in the preparation of electrochemical membranes, electrochemical systems and of electrochromic systems. Also, electrochemical and electrochromic systems obtained hereby that exhibit, in particular, excellent electrochemical properties at low temperatures.

22 Claims, 12 Drawing Sheets

IN-SITU PSS FABRICATION PROCESS

1 SS precursor
2 polymer membrane
3 conducting glass
4 transparent electrode
5 counter electrode
6 sealant(Torr Seal)
7 PSS

(51) Int. Cl.
*H01B 1/12* (2006.01)
*H01M 10/052* (2010.01)
*H01M 10/0565* (2010.01)
*C08J 3/09* (2006.01)

(52) U.S. Cl.
CPC ..... *H01M 10/052* (2013.01); *H01M 10/0565* (2013.01); *C08J 2327/16* (2013.01); *C08J 2333/12* (2013.01); *H01M 2300/0022* (2013.01); *H01M 2300/0091* (2013.01); *Y02P 20/54* (2015.11); *Y10T 29/4911* (2015.01)

(56) References Cited

U.S. PATENT DOCUMENTS

| | | |
|---|---|---|
| 5,683,832 A | 11/1997 | Bonhote et al. |
| 6,190,804 B1 | 2/2001 | Ishiko et al. |
| 6,245,847 B1 | 6/2001 | Green et al. |
| 6,280,882 B1 | 8/2001 | Vallee et al. |
| 6,344,293 B1 | 2/2002 | Geronov |
| 6,853,472 B2 | 2/2005 | Warner et al. |
| 2002/0110739 A1 | 8/2002 | McEwen et al. |
| 2002/0182469 A1* | 12/2002 | Nishiura ................ C08G 65/22 429/317 |
| 2003/0031858 A1 | 2/2003 | Bronstert |
| 2004/0021928 A1 | 2/2004 | Warner et al. |
| 2005/0069780 A1 | 3/2005 | Kinouchi et al. |
| 2005/0103706 A1 | 5/2005 | Bennett et al. |

FOREIGN PATENT DOCUMENTS

| | | |
|---|---|---|
| CA | 2 503 893 A1 | 5/2004 |
| CA | 2 418 257 A1 | 7/2004 |
| EP | 1 249 461 B1 | 10/2002 |
| EP | 1 339 842 A2 | 3/2003 |
| JP | 61-043681 | 3/1986 |
| JP | 62-032169 | 2/1987 |
| JP | 11-251194 A | 9/1989 |
| JP | 04-211227 A | 8/1992 |
| JP | 1994-119087 A | 4/1994 |
| JP | 08-259543 A | 10/1996 |
| JP | 11-176452 A | 7/1999 |
| JP | 2000-507387 A | 6/2000 |
| JP | 2002-082360 A | 3/2002 |
| JP | 2003-156767 A | 5/2003 |
| JP | 2004-170613 A | 6/2004 |
| JP | 2005-530894 A | 10/2005 |
| JP | 2006-501600 A | 1/2006 |
| JP | 2006-506775 A | 2/2006 |
| JP | 2006-517051 A | 7/2006 |
| WO | WO 95/26056 A1 | 9/1995 |
| WO | WO 98/32183 A1 | 7/1998 |
| WO | WO 01/52338 A1 | 7/2001 |
| WO | WO 02/46101 A2 | 6/2002 |
| WO | WO 03/063287 A2 | 7/2003 |
| WO | WO 2004/001877 A2 | 12/2003 |

OTHER PUBLICATIONS

Bétrice Garcia et al., "Room temperature molten salts as lithium battery eletrolyte", Alectochimica Acta 49 (2002) pp. 4583-4588.
Lovering David G. et al., "Molten Salt Techniques", vol. 1, Plenum Press—New York and London, A Division of Plenum Publishing Corporation, pp. 1-6.
Kubo, T. et al., "Current State of the Art for NOC-AGC Electrochromic Windows for Architectural and Automotive Applications" Solid State Ionics 165 2003 pp. 209-216.
Morand, Genevieve et al., "Electrochimie des Sels Fondus Tome 1—proprietes de transport" Editions: Paris Masson 1969.
Nakagawa, Hiroe et al, "Relationship Between Structural Factor of Gel Electrolyte and Characteristics of Electrolyte and Lithium-ion Polymer Battery Performances", The 44th Symposium in Japan, Nov. 4-6, 2003, abstract 3026 [Abstract in English].
Satas, D. editor "Coatin s Technology Handbook" Marcel Deckker, Inc., NY, NY 1991 p. 19.

* cited by examiner

PSS CROSS-LINKING BY ELECTRON BEAM

1 PSS PRECURSOR
2 COATING HEAD (Doctor Blade)
3 PSS FILM
4 PSS SUPPORT
5 DRYING CORRIDOR
6 ELECTRON BEAM MACHINE

PSS CROSS-LINKING BY UV RADIATION

1 PSS PRECURSOR
2 COATING HEAD (Doctor Blade)
3 PSS FILM
4 PSS SUPPORT
5 DRYING CORRIDOR
6 UV LAMP 1 SUBSTRATE MADE OF GLASS OR PLASTIC
2 TRANSPARENT OXIDE FILM
3 PSS
4 COUNTER ELECTRODE
6 SEALANT
7 CONDUCTING FILM

APROTIC POLYMER-MOLTEN SALT-SOLVENT TERNARY COMPOSITION, METHOD FOR THE PREPARATION AND USE THEREOF IN ELECTROCHEMICAL SYSTEMS

CROSS REFERENCE TO RELATED APPLICATIONS

The present application is a continuation of U.S. application Ser. No. 11/576,940, filed on Apr. 9, 2007, which is a U.S. national stage of International Application No. PCT/CA2005/001553, filed on Oct. 11, 2005, which claims the benefit of Canadian Application No. 2,482,003, filed on Oct. 12, 2004. The entire contents of each of U.S. application Ser. No. 11/576,940, International Application No. PCT/CA2005/001553, and Canadian Application No. 2,482,003 are hereby incorporated herein by reference in their entirety.

FIELD OF INVENTION

The present invention concerns an electrolyte obtained from an aprotic polymer-molten salt-solvent ternary mixture, hereafter referred to as PSS, and/or from the corresponding quaternary mixture, hereafter referred to as PSSS, additionally incorporating an ion-conducting salt, as well as the preparation processes of such electrolytes, particularly those implementing mixing steps.

Another object of the present invention consists in a preparation process of electrochemical membranes from a ternary mixture and/or from a quaternary mixture of the invention, as well as in the electrochemical membranes thereby obtained.

Another object of the present invention resides in the preparation of electrochemical systems comprising at least one electrolyte according to the invention and in the electrochemical systems thereby obtained.

Another object of the present invention consists in a preparation process of an electrochromic device, and more particularly in an electrochromic window including a PSS-type and/or PSSS-type electrolyte according to the invention, as well as the electrochromic devices thereby obtained.

When in its transparent, homogenous and liquid form, the electrolyte of the invention is preferably used in electrochromic and catalytic applications.

Amongst the numerous applications proposed for the electrolytes and membranes of the invention, their use as a separator and as an ion conductor in electrochromic type cells and, more particularly, in electrochromic windows is notably mentioned.

Electrochromic windows thus obtained are notably of particular interest owing to their energy efficiency in a wide operating temperature range, the using comfort provided by their light control, and their architectural aesthetics.

PRIOR ART

Molten salt-based electrolytes are notably described in the publication Room temperature molten salts as lithium battery electrolyte, Armand et al., published in Electroehimica Acta 49 (2004)4583-4588. The electrolytes described in this document are intended for use in lithium batteries and contain neither polymer nor solvent and there is no mention of transparency.

Multibranch polyether polymer-based electrolytes are described in the Dai-Ichi-Kogyo Seiyyaku Co. European Patent Application EP-A-1,249,461, these electrolytes contain no molten salt and are not transparent.

Electrolytes obtained from 3-branch polymers are described in the Hydro-Québec patent U.S. Pat. No. 6,280,882, published on Aug. 28, 2001. They are transparent but contain no molten salt.

Electrolytes obtained from 4-branch polymers are described in the Hydro Québec international application WO 03/063287. The polymers mentioned present acrylate (preferably methacrylate) and alkoxy (preferably alkoxy with 1 to 8 carbon atoms, even more preferably methoxy or ethoxy), or even vinyl hybrid end groups. At least one branch of said four-branch polymer, and preferably at least two branches being susceptible to produce cross-linking. These polymers are transformed into polymer matrix, possibly in the presence of an organic solvent, by cross-linking. The electrolytes thus obtained possibly contain a lithium salt, do not contain any molten salt but are transparent.

The patent issued in the U.S. Pat. No. 6,245,847 describes an electrolyte comprising a composite of a non-aprotic polymer, a solvent and an organic salt immobilized in the polymer and its applications in electrochemical cells, supercapacitors or electrochromic windows or displays. In this case, the polymer is inert, it acts as a matrix in order to obtain the film. Another inconvenience of this technology resides in the fact that despite the use of a polymeric film, the liquid still remains mobile in the polymer matrix, which reduces the safety of the electrochemical system.

The patent issued in the U.S. Pat. No. 5,484,670 describes a binary lithium ion electrolyte containing a lithium salt and a small proportion of an anionic polymer lithium salt, as well as the mention of its use in primary or secondary batteries and in photochromic and solar devices. However, these mixtures present inconveniences with respect to their low-temperature conductivity level.

The patent issued in the U.S. Pat. No. 5,643,490 describes a polymer solid polymer electrolyte composition comprising an organic polymer having an alkyl quaternary ammonium salt structure, a nitrogen-containing heterocyclic quaternary ammonium salt and a metal salt. This electrolytic material is of the solid type and that does not relate to lithium salt technology.

The patent issued in the U.S. Pat. No. 6,853,472 describes a binary electrolyte having a glass transition temperature of less than about $-40°$ C., comprising at least one bifunctional redox dye dissolved in an ionic liquid solvent. The Most significant difference is that it is an electrolyte solution that remains in liquid form.

The U.S. patent application Ser. No. 00/501,03706 describes a sensor comprising an ionic polymer membrane having at least a first ion connected ionically to a second ion and an ionic liquid positioned in the membrane.

The membrane used is a Naflon®-type film, and so there is no polymer element as such and the applications considered are different.

The international application published under number WO 01/52338 describes electrolytic compositions characterized in that they contain, according to a homogenous mixture, one or several polymers, acting as a matrix, one or several conducting salts one or several molten salts. In this document, the polymer mentioned is used as a support matrix to form a separator.

The publication of T. Kubo et al. Current state of art for NCO_AGC electrochromic windows for architectural and automotive application, in the journal Solid States Ionics 165(2003) pages 209 to 216, presents the synthesis of donor-acceptor type organic electrochromic (EC) materials making it possible to increase resistance to ultraviolet irradiation. Two types of electrochromic windows (ECWs) are described therein. The first window is obtained with a viologen-ferrocene material and the other with a carbon-based electrode. On pages 97 to 104 of the same document, the author also describes a carbon-based counter electrode for electrochromic windows presenting a significant durability owing to the incorporation of the counter electrode. These electrochromic windows differ from those object of the present invention in that the separator used is binary, polymer and solvent based, in a gel form. These prior art windows have inconveniences in terms of the safety and rapidity of response of the coloring/bleaching process.

Therefore, there was a need for new electrolytes preferably in liquid form and making it possible to obtain new electrochemical systems with improved properties, notably in low-temperature operation.

There was also a need for electrochromic devices devoid of at least one of the inconveniences of the prior art devices and presenting interesting properties notably in coloring/bleaching, stability and safety.

DETAILED DESCRIPTION OF THE INVENTION

Preliminary Definitions

Figure 1:
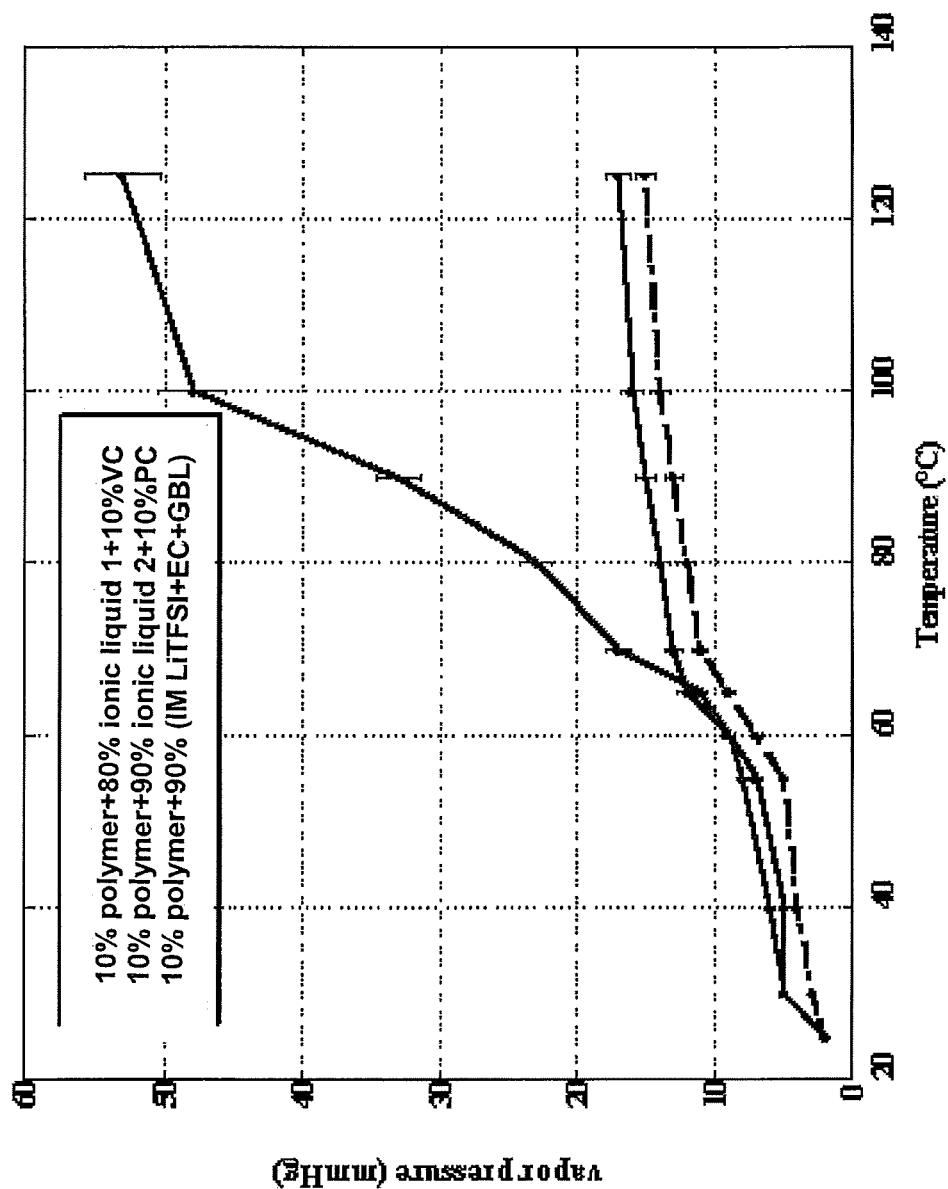
FIG. 1: illustrates the vapour pressure of the liquid electrolyte 1.5M LiBF4 in the mixture (EC+ GBL), compared to the two molten salts evaluated separately, between 25 and 40° C. The curves emphasize the safety aspect of the PPS film.

In the framework of the present invention, an aprotic polymer is defined as a polymer or as a mixture of polymers capable of contributing to the dissociation of salts.

Preferably, the term aprotic polymer refers to any polymer or polymer mixture having:
  in the case of the ternary mixtures of the invention, a capacity to dissociate molten salts; and/or
  in the case of the quaternary mixtures of the invention, a capacity to dissociate molten salts and ionic salts; and
  a capacity to ensure the hopping transport of the released ions by dissociation.

More particularly, aprotic polymers refer to those which, when placed in a generator as a separator and/or as a binder in the cathode, allow the system to deliver a current when a voltage is applied.

For example, the Li/separator PA/Composite cathode ($LiV_2O_5$-PA-carbon) system. This system shows a voltage when fully charged of 3.3 volts and can deliver current peaks of 7 $mA/cm^2$ at 60° C. As opposed to a system with a non-aprotic polymer (PVDF), it delivers no current without the addition of solvent in the electric cell. AP is the abbreviation for aprotic polymer.

The polymer or mixture of polymers, present in the ternary or quaternary mixture, is preferably selected from the family of 3-branch (preferably those described in the Hydro-Québec U.S. Pat. No. 6,280,882)), 4-branch (preferably those described in Hydro-Québec patent application WO. 03/063287) polyether polymers, of GE-type vinyl polymers, preferably those described in the DKS patent application EP-A-1.249.461 and of mixtures of at least two of the latter; the documents cited in this paragraph are incorporated by reference in the present application.

3-Branch Polymers

As illustrated in the document Relationship between Structural Factor of Gel Electrolyte and Characteristics of Electrolyte and Lithium-ion Polymer Battery Performances, by Hiroe Nakagawa et al., The $44^{th}$ Symposium in Japan, Nov. 4-6, 2003, abstract 3D26, three-branch polymers have the form of a 3-branch comb. The 3 slightly parallel branches of these polymers are preferably fixed to the center and to the two extremities of a small size backbone, preferably comprising 3 atoms, preferably 3 carbon atoms, in the chain.

In the case of a 3-carbon atom chain, each of these atoms is attached to a branch.

Amongst these 3-branch polymers, and in the framework of the present invention, those presenting a mean molecular weight (MW) between 1,000 and 1,000,000, even more preferably those whose mean molecular weight is between 5,000 and 100,000 are preferred.

The patent application WO. 03/063287 describes a preferred family of four-branch polymers.

Such polymers have the form of a 4-branch comb. The 4 more or less parallel branches of these polymers are fixed respectively between the two extremities (preferably fixed symmetrically on the chain) and to the two extremities of a small size chain, preferably constituted by a chain comprising 4 atoms which are preferably 4 carbon atoms.

In the case of a 4-carbon atom chain, each atom is linked to a branch.

Such polymers preferably have hybrid end groups, even more preferably acrylate (preferably methacrylate) and alkoxy (preferably alkoxy with 1 to 8 carbon atoms, even more preferably methoxy or ethoxy), or even vinyl hybrid end groups, at least one branch of said four-branch polymer (and preferably at least two branches) being likely to produce cross-linking.

Preferably, the four-branch polymer is one of those defined in columns 1 and 2 of American patent U.S. Pat. No. 6,190,804. This document is incorporated by reference in the present application.

This polymer is preferably a star polymer of the polyether type with at least four branches having end groups containing the following functions: acrylate or methacrylate and alkoxy, allyloxy and/or vinyloxy, at least one, and preferably two of these functions of which are active to allow cross-linking. The stability voltage of an electrolytic composition according to the invention containing this polymer is definitely over 4 volts.

According to a preferred embodiment of the present invention, the 4-branch polymer is a tetrafunctional polymer, preferably high molecular weight, responding to the formula:

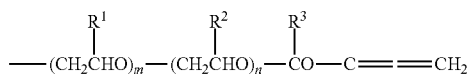

in which $R^1$ and $R^2$ each represent a hydrogen atom or an inferior alkyl (preferably 1 to 7 carbon atoms); $R^3$ represents a hydrogen atom or a methyl group; m and n each represent a whole number over or equal to 0; in each high molecular chain, $m+n>35$; and each one of group $R^1$, $R^2$, $R^3$ and each one of parameters m and n may be identical or different in the 4 high molecular chains.

Amongst these four-branch polymers, those having a mean molecular weight comprised between 1,000 and 1,000,000, even more preferably those having a mean molecular weight comprised between 5,000 and 100,000 are particularly interesting.

According to another preferred mode, star-type polyethers having at least four branches with a hybrid end group (acrylate or methacrylate and alkoxy, allyloxy, vinyloxy) are retained. Its stability voltage is clearly over 4 volts.

DKS Patent application EP-A-1,249,461 describes the method used to prepare this preferred family of polyether polymer compounds. They are obtained by reacting ethylene oxide and propanol-1-epoxy-2,3 with the starting material, or by reacting propanol-1-epoxy-2,3 with ethylene glycol as the starting material to produce a polymer compound. This step is followed by the introduction of polymerizable and/or non-polymerizable functional groups at each end of a skeleton and the side chains in the resulting polymer compound.

Compounds having one or several active hydrogen residues and alkoxide may also be used as starting material.

Examples of active hydrogen residues for the compound having one or several active hydrogen residues include the group of hydroxyls, preferably having 1 to 5 active hydrogen residues. Specific examples of compounds having one or several active hydrogen residues include triethyleneglycol monomethylether, ethyleneglycol, glycerine, diglycerine, pentaerythritol and their derivatives.

Specific examples of alkoxide also include $CH_3ONa$, t-BuOK and their derivatives. The polyether polymer compounds of the invention have the structure unit represented by formula (1) as well as the structure unit represented by formula (2) and/or the structure unit represented by formula (3). The number of structure units represented by formula (1) in one molecule is from 1 to 22,800, more preferably from 5 to 11,400, and even more preferably from 10 to 5,700. The number of structure units of formula (2) or (3) (but when both are included, it is the total number) is from 1 to 13,600, more preferably from 5 to 6,800, and even more preferably from 10 to 3,400 as well as in one molecule.

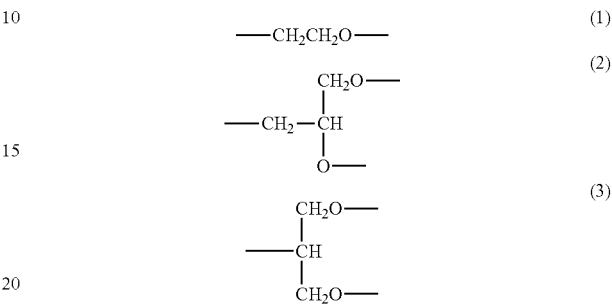

Examples of polymerizable functional groups introduced at each molecular extremity include (meth)acrylate residues, allyl groups and vinly groups, and examples of non-polymerizable functional groups include alkyl groups or functional groups comprising boron atoms.

Like the above alkyl groups, alkyl groups having 1 to 6 carbon atoms are preferable, those having 1 to 4 carbon atoms are more preferable, and methyl groups are especially preferable.

Examples of functional groups comprising boron atoms include those represented by the following formulas (4) or (5).

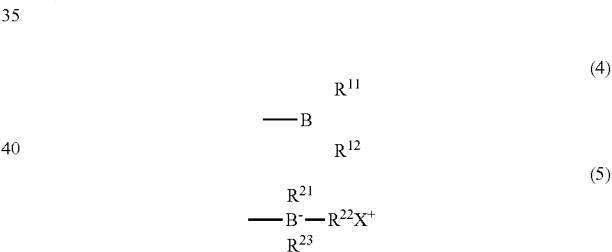

$R^{11}$, and $R^{12}$ in formula (4) and $R^{21}$, $R^{22}$, $R^{23}$ in formula (5) may be identical or different, and each represents hydrogen, halogen, alkyl, alkoxy, aryl, alkenyl, alkynyl, aralkyl, cycloalkyl, cyano, hydroxyl, formyl, aryloxy, alkylthio, arylthio acyloxy, sulfonyloxy, amino, alkylamino, arylamino, carbonamino, oxysulfonylamino, sulphonamide, oxycarbonylamino, ureide, acyl, oxycarbonyl, carbamoyl, sulfonyl, sulfinyl, oxysulfonyl, sulfamoyl, carboxylate, sulfonate, phosphonate, heterocyclic, $—B(R^a)(R^b)$, $—OB(R^a)(R^b)$ or $OSi(R^a)(R^b)(R^c)$. $(R^a)$, $(R^b)$ and $(R^c)$ each represent hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulphonamide, oxycarbonylamino, ureide, acyl, oxycarbonyl, carbamoyl, sulfonyl, sulfinyl, oxysulfonyl, sulfamoyl, carboxylate, sulfonate, phosphonate, heterocyclic or derivatives thereof. $R^{11}$, and $R^{12}$ in formula (4) and $R^{21}$, $R^{22}$, $R^{23}$ in formula (5) may bind together to form a ring, and the ring may have substituents. Each group may also be substituted by substitutable groups. Further, $X^+$ in formula (5) represents an alkali metal ion, and is preferably a lithium ion.

The extremities of molecular chains in the polyether polymer may be all polymerizable functional groups, non-polymerizable functional groups, or may include both.

The mean molecular weight (Mw) of this type of polyether polymer compound is not especially limited, but is usually from about 500 to 2 million, and preferably from about 1,000 to 1.5 million.

In other respects, the polymers in these preferred families are preferably selected amongst polymers that are cross-linkable by Ultra-Violet, Infrared, thermal treatment and/or electron beam (EBeam).

These polymers are preferably selected transparent.

Amongst the polymers that may be preferably used for the preparation of the ternary mixture of the invention, those that are liquid at room temperature are most particularly mentioned. They represent a particular interest owing to the fact that they do not require a coating solvent.

In other respects, when polymer mixtures are used in the ternary and/or quaternary mixtures of the invention, at least 20% by weight of aprotic polymer is preferably required in the mixture.

In the framework of the present invention, the work Molten Salt Techniques—Volume 1, D. G. Lovering and R. J. Gale, 1942, Editor Plenum Press New York C 1983-1984, more particularly on pages 2 to 5, is referred to for the definition of molten salts, in their generality, this document is incorporated by reference in the present application.

G. Morant and J. Hladik in Électrochimie des sels fondues Tome 1—propriétés de transport Editions: Paris Masson 1969, specify more particularly in the chapter concerning solvent properties, that, based on the structure of liquid, molten salts may be divided into two groups. The first group is constituted by compounds like alkaline halides binded mainly by ionic forces and, the second group includes compounds essentially comprising covalent bonds.

Molten salts are specific solvents, considered as ionized solvents, in which it is possible to easily dissolve inorganic compounds and to work at high temperatures. They are often ionic salts such as' LiCl—KCl, NaCl—KCl and $LiNO_3$—$KNO_3$. This definition is extracted from session 2003, épreuve spécifique—filiére PC—Institut National Polytechnique de Toulouse.

In the framework of the present invention, and more particularly for electrochromic applications, molten salts refer to salts that are in liquid form at a temperature comprised between −30 and 350° C., preferably between −20 and 60° C. Actually, at temperatures over 350° C., polymers present in the mixtures of the invention would be carbonized.

Even more particularly, the molten salts of interest in the framework of the present invention are those constituted by at least two salts selected from the group constituted by imidazolium, imidinium, pyridinium, ammonium, pyrolium, sulfonium, phosphonium salts, as well as by the mixtures of at least two of the latter.

By way of preferred examples, are cited soluble hydrophobic salts described in U.S. Pat. No. 5,683,832 and those described in the document Room temperature molten salts as lithium battery electrolyte, Armand et al. Electrochimica Acta 49 (2004) pages 4583-4588, as well as the mixtures of at least two of the latter. This document is incorporated by reference in the present application.

These molten salts are present in the polymer-molten salts-solvent (PSS) ternary mixtures of the invention. These mixtures as well as the corresponding quaternary mixtures obtained by adding an ion-conducting salt, are in homogenous and liquid form at room temperature.

In the framework of the ternary mixtures object of the present invention, solvent refers to any solvent having the capacity to:
  dissolve the molten salts present in the ternary mixtures;
  dissolve the molten salts and the ion-conducting salts present in the quaternary mixtures; and
  possibly dissolve the aprotic polymer.

It is preferably an organic solvent or a mixture of organic solvents and, more preferably, those selected from the group constituted by methanol, dimethylformamide, tetrahydrofuran, ethanol, propanol, N-methyl pyrollidone, and the cyclic solvents: cyclic carbonate, cyclic ester alkyl and ethers like propylene carbonate, diethyl carbonate, dimethylcarbonate, ethylene carbonate and gamma butyrolactone, and the mixtures of at least two of the latter.

In the framework of the present invention, ion-conducting salt, and as a complement to the definition given for aprotic polymer, refers to a salt that ensures ionic conductivity by releasing electrons that transit from the anode to the cathode.

Preferably, the ion-conducting salt will be selected from the group constituted by $LiN(SO_2CF_3)_2$:LiTFSl, $LiN(SO_2C_2F_5)_2$:BETl, $LiC(SO_2CF_3)_3$, $LiBF_4$, $LiPF_6$, $LiClO_4$, $LiSO_3CF_3$, $LiAsF_6$, LiBOB, LiDCTA, and Lil.

Excellent results have been obtained with LiTFSl.

In the framework of the present invention, electron-conducting polymer refers to a polymer that acts as an active material represented by an electrode in an electrochemical system in which it ensures the electronic conduction.

In the framework of the present application, electrochemical membrane refers to a film obtained by application on the substrate to be coated of a layer of a viscous liquid comprising a ternary and/or quaternary mixture according to the invention.

In the case where a non-cross-linkable aprotic polymer is used, it is necessary to add a second solvent to solubilize the polymer, then for example to perform a thermal treatment.

In the case where a high molecular weight polymer is used, it is necessary to add a second solvent to solubilize the polymer.

After treatment, the film forms at the surface of the substrate and adheres to it.

The first object of the first object of the present invention is an aprotic polymer-molten salt-solvent (PSS) ternary mixture.

According to a preferable embodiment of the invention, the ternary mixtures of the invention are homogenous and liquid at room temperature.

In these mixtures, the aprotic polymer is selected from the group constituted by aprotic polymers and by the mixtures of at least two of the latter, and by the mixtures of polymers comprising at least 20% by weight of an aprotic polymer.

According to a preferable variant, the polymers present in the mixtures of the invention have a mean molecular weight (MW) comprising between 1,000 and 1,000,000, even more preferably comprising between 5,000 and 100,000.

These mixtures preferably present a transparency over 80%, wherein said transparency being measured using a UV-IR type near IR Variant brand device, a 2 mm thick mineral glass plate as reference of 100% transparency and a sample to measure constituted:
  in the case where a cross-linkable aprotic polymer is present in the ternary mixture, by a film, solid at room temperature, with a thickness comprised between 20 and 100 microns, wherein said film being obtained by coating and cross-linking of said ternary mixture;

or in the case where no cross-linkable aprotic polymer is present in the ternary mixture, by a gel film of the ternary mixture with a thickness comprised between 10 and 30 microns (preferably varying from 20 to 30 microns), wherein said gel being applied between two transparent glass plates.

Amongst the preferred mixtures, those presenting a transparency over 90% may be cited.

Preferably, the aprotic polymer is of the cross-linkable type.

According to a preferable variant of the invention, the cross-linkable polymer presents a percentage of cross-linkable bonds over 80%.

Preferably, the cross-linkable polymers presenting a percentage of cross-linkable bonds comprised between 5 and 50%, even more preferably with a percentage of cross-linkable bonds comprised between 10 and 30%, will be retained.

According to a particularly preferable embodiment of the invention, the cross-linkable polymer is selected from the group constituted by 3-branch and 4-branch polyether polymers, GE-type vinyl polymers (EO-GD, that is ethylene oxide-2,3 epoxy 1 propanol) and mixtures of at least two of these polymers.

Another variant of the invention is constituted by the ternary mixtures in which the polymer is non-cross-linkable.

Such polymers are preferably selected from the group constituted by the polymers of the type polyvinyldienefluoride (PVDF) and poly(methylmetacrylate) PMMA and by the mixtures of at least two of the latter.

According to another variant of the invention, protic polymer is constituted by a mixture of at least one cross-linkable polymer and at least one non-cross-linkable polymer. Even more preferably, such a mixture comprises at least one PMMA.

Preferably, the aprotic polymer is constituted by a mixture of at least one cross-linkable polymer and at least one non-cross-linkable polymer; preferably for electrochemical systems, the ratio of cross-linkable polymer to non-cross-linkable polymer is about 50:50, while in the case of electrochromic windows, this ratio is about 80:20.

According to a preferred variant of the invention, the molten salt present in the ternary mixture is selected amongst those melted at a temperature comprised between −40 and 350° C. Even more preferably, this molten salt is selected amongst those melted at a temperature comprised between −20 and 60° C.

By way of illustration, at least two salts selected from the group constituted by imidazolium, imidinium, pyridinium, ammonium, pyrolium, sulfonium and phosphonium salts and by the mixtures of at least two of the latter will be selected to constitute the molten salt.

Preferably, molten salts in the group constituted by the soluble hydrophobic salts described hereinabove will be selected to minimize absorption of water molecules which may induce bubbles into the systems.

According to a preferred variant of the embodiment of the invention, the solvent present in the ternary mixture is selected from the group constituted by organic solvents preferably selected from the group constituted by the solvents of the type EC, PC, DMC, DEC, EMC, GBL, VC, VB, by inorganic solvents like KOH, NaOH and by the mixtures of at least two of the latter.

According to another preferred mode, the solvent retained will be, a mixture of an organic solvent and a mineral solvent.

Preferably, the solvent retained is of the organic type and presents a boiling point over 125° C. in standard temperature and pressure conditions.

Amongst the ternary mixtures of the invention, may be mentioned as being of particular interest those containing by weight:

a. from 1 to 98%, preferably from 5 to 70 mole percent of aprotic polymer;
b. from 1 to 98%, preferably from 5 to 70 mole percent of molten salt; and
c. from 1 to 98%, preferably from 7 to 70 mole percent of solvent, the total weight of the constituents of the ternary mixture being equal to 100%.

Of an even more pronounced interest amongst these ternary mixtures are those characterized by a viscosity varying from 1 to 5,000 cP, more preferably those presenting a viscosity of 5 to 500 cP.

The viscosity of the ternary mixtures of the invention is measured at 25° C. using the Cambridge applied system viscometer, referenced in the publication Room temperature molten salts as lithium battery electrolyte, Armand et al. in Electrochimica Acta 49 (2004) pages 4583-4588

The ternary mixtures of the invention find many applications, notably in electrochromic windows owing to their preferable characteristics of conductivity, safety, transparency and low-temperature operation.

The second object of the present invention is constituted by a quaternary mixture comprising a ternary mixture as defined in the first object of the present invention and an ion-conducting salt.

According to a preferable embodiment of the present invention, the ion-conducting salt is preferably selected from the group of alkaline-earth salts, preferably in the group constituted by lithium salts, preferably those selected from the group constituted by the lithium salts of the type LiTFSl, LiFSl, LiBOB, LiTFSl, LiDCTA, LiClO$_4$, LiCF$_3$SO$_3$, LiPF$_6$, LiBF$_4$, LiI and mixtures of at least two of the latter.

Particularly preferable, the quaternary mixtures of the invention are characterized by a concentration of conducting salt varying from 0.01 to 3M (M:molar). Even more preferably, this concentration of conducting salt varies from 0.5 M to 2.5 M.

According to another interesting variant of the invention, the quaternary mixture contains by weight:

d. from 1 to 98%, preferably from 5 to 70 mole percent of polymer;
e. from 1 to 98%, preferably from 5 to 70 mole percent of molten salt;
f. from 1 to 98%, preferably from 7 to 70 mole percent of solvent; and
g. from 1 to 98%, preferably from 7 to 70 mole percent of ion conducting salt, the total weight of the constituents of the quaternary mixture being equal to 100%.

More preferably, the quaternary mixture is characterized by a viscosity varying, preferably from 1 to 5,000 cP, even more preferably from 5 to 500 cP.

The viscosity of the quaternary mixture also being measured at 25° C. using the Cambridge applied system viscometer in the publication Room temperature molten salts as lithium battery electrolyte, Armand et al. in Electrochimica Acta 49 (2004) 4583-4588.

According to a preferable embodiment, the polymer is cross-linkable by at least one of the following methods: UV, IR, thermal and Ebeam.

The ternary mixtures of the invention find their application as polymeric separators in electrochemical systems, they notably present advantages such as conductivity, safety, low-temperature operation and transparency in the case where the systems are electrochromic windows.

Quaternary mixtures are ternary mixtures in which one or several ion-conducting salts have been added in order to increase the ionic conduction of the mixture for applications requiring very rapid responses (supercapacitor, power batteries, ultra rapid response electrochromic windows.

The third object of the present invention is constituted by a preparation process of a ternary mixture according to the first object hereinbefore defined, or of a quaternary mixture according to the second object hereinbefore defined, preferably by mixture, in an indifferent order, of the components of said ternary or quaternary mixture.

One of the advantages of the mixtures of the present invention resides in their capacity to be prepared in one single mixture and to result in one single homogenous phase.

Preferably, this mixture is prepared at room temperature and at a controlled pressure (argon, nitrogen, helium). The mixture is preferably prepared on a roll mixer.

The fourth object of the present invention resides in a preparation process of a membrane from a ternary mixture according to the first object and/or from a quaternary mixture according to the second object, and/or from a ternary or quaternary mixture as prepared by the implementation of one of the processes described in the third object of the invention.

One of the processes preferably used for the preparation of the electrochemical membranes of the invention is described in patents CA-A-2,471,395, CA-A-2,418,257 and EP-A-1,339,842, (these documents are incorporated by reference in the present application) from a ternary mixture object of the invention, or from a quaternary mixture object of the invention or from a ternary or quaternary mixture, as prepared by the implementation of one of the processes object of the invention.

According to a preferred form, this process of the invention is used for the preparation of an electrochemical membrane of non-salted polymer (that is, containing no ion-conducting salts such as alkaline-earth salts or lithium salts described in the definition of the quaternary mixtures) is soaked in a SS (solvent-molten salt) salted mixture, that is containing at least one conducting salt such as an alkaline earth or lithium salt, preferably one of the lithium salts specifically described in the second object of the invention, after abutment on one of the electrodes.

According to another preferable form of implementation of this process, the non-salted polymer membrane is soaked in a non-salted SS mixture, after abutment on one of the electrodes.

According to another preferable form of implementation of the process, the salted polymer membrane is soaked in a salted SS mixture, after abutment on one of the electrodes.

According to another variant, the salted polymer membrane is soaked in a non-salted SS mixture, after abutment on one of the electrodes.

Preferably, the ion-conducting salt is dissolved in the molten salt. Even more preferably, the ion-conducting salt is dissolved in the solvent.

According to another preferred mode of preparation of the membrane, the salted or non-salted polymer membrane is abutted on one of the electrodes and adheres to it.

A fifth object of the present invention resides in the preparation of an electrochemical system comprising at least two electrodes and at least one electrolyte constituted from a PSS (Polymer-molten Salt-Solvent) mixture and/or from a PSSS (Polymer-molten Salt-Solvent-ion-conducting salt) mixture according to the invention.

According to a preferred form, the electrochemical systems prepared comprise at least one anode, at least one cathode and at least one PSS and/or PSSS electrolyte.

Figure 10:
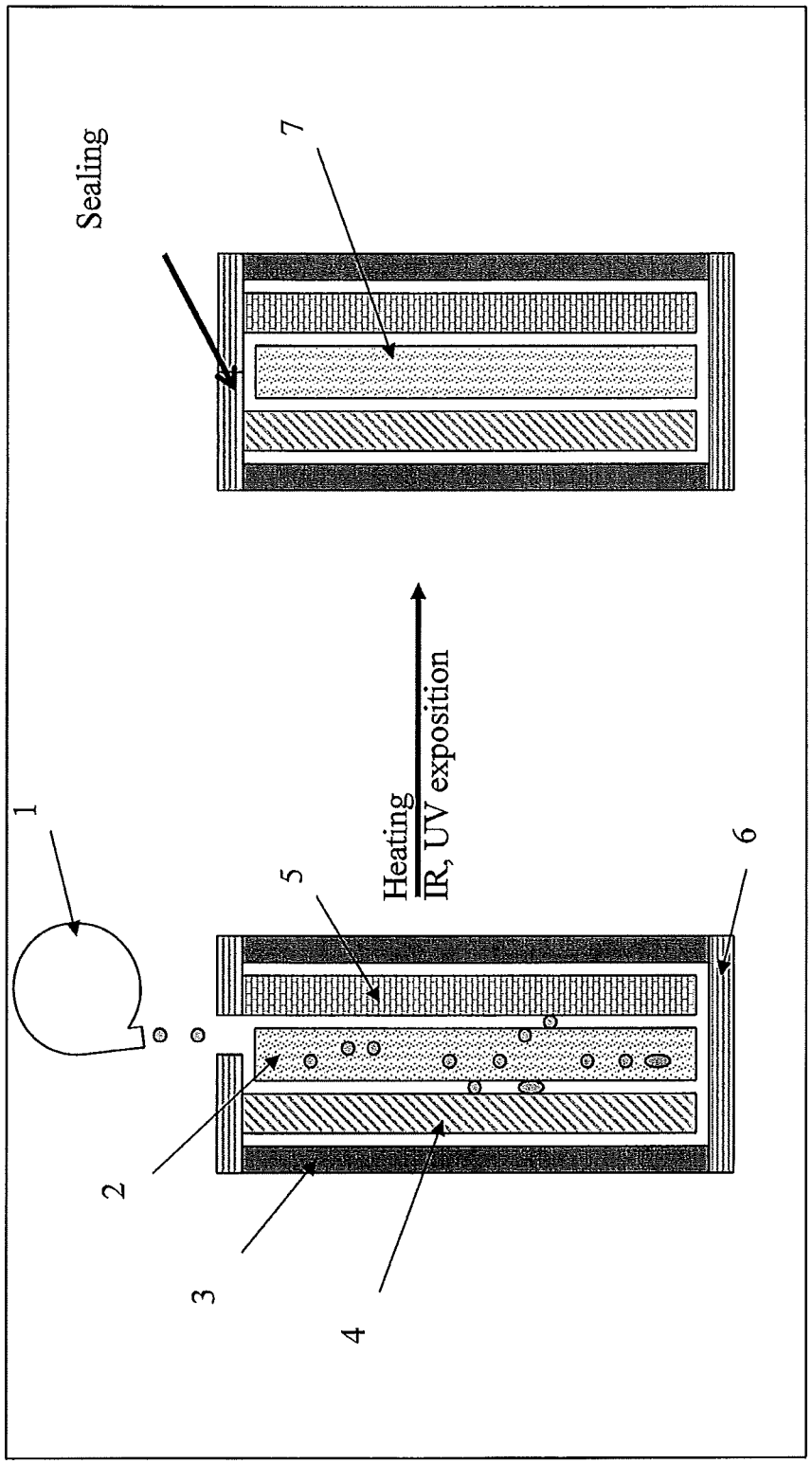
FIG. 10: illustrates the in situ formation of PSS either by thermal heating or by infrared or UV radiation or their combinations.

According to a preferred mode of implementation, the process is used for the preparation of an electrochemical system, preferably of an electrochemical system as represented in FIG. 10 and which represents an electrochromic window.

Even more preferably, this process is used for the preparation of an electrochemical system comprising at least one intercalation electrode and at least one double layer electrode.

So, preferably, a preparation process of a battery-type generator the anode of which is selected from the group constituted by the electrodes of the type lithium, lithium alloy, carbon, graphite, metal oxide and the cathode of $LiFePO_4$, $LiCoO_2$, $LiMn_2O_4$, $LiNiO_2$, $LiMn_{1/3}CO_{1/3}Ni_{1/3}O_2$, and the mixtures of at least two of the latter are cited.

A sixth object of the present invention consists in electrochemical systems obtained by the implementation of one of the processes according to the fifth object of the invention.

A seventh object of the present application is constituted by a preparation process of an electrochemical device, preferably of an electrochromic device such as an electrochromic window.

The electrochromic systems considered in the framework of the present invention are notably those constituted by:
  a solid transparent substrate, preferably a substrate made of glass or plastic;
  a transparent oxide film;
  a PSS and/or PSSS film;
  a counter electrode; and
  a sealant.

According to a preferable embodiment of this object of the invention, the preparation of these electrochemical systems is carried out by the implementation of the following steps:
  preparation of a solid transparent substrate, preferably made of glass or plastic, having a transparent conducting layer;
  preparation of a transparent and conducting oxide-based cathode;
  preparation of a PSS-type and/or PSSS-type transparent electrolyte presenting transparency preferably over 80% or of a non-transparent electrolyte (in the case of applications other than electrochromic windows);
  preparation of an anode (counter electrode) based on a transparent oxide or based on a conducting polymer or based on a carbon on a solid transparent substrate, preferably made of glass or plastic, having a transparent conducting layer;
  assembly of the hereinbefore prepared elements; and
  sealing of the extremities (perimeters) of the substrates with a sealant preferably selected from the group constituted by glues commercialized under the Variant society Torr-Seal low vapour pressure resin trademark.

Such a process is particularly well adapted for the preparation of electrochromic windows.

According to a preferable implementation variant of the process of the invention for the preparation of an electrochromic system, a ternary or quaternary mixture is coated on one of the electrodes and after abutment on the other electrode.

According to another preferred form, the preparation process of an electrochromic device (preferably of a window) of the invention is applied in the case where the cathode is based on a metal oxide selected from the group constituted by $WO_3$, $MoO_3$, $V_2O_5$, $LioTi_5O_{12}$, electron-conducting polymer, and mixtures of at least two of the latter.

According to another application variant of the process, the anode is based on a metal oxide selected from the group constituted by: IrOx, LiVOx, NiOx, NiOxHy (where x is comprised between 00.1 and 0.2), $Ta_2O_5$, $Sb_2O_5$, electron-conducting polymer (that can replace oxides like polyaniline also known as PANT) and the mixtures of at least two of the latter.

Preferably, the PSS mixture is introduced in the device in the space separating the two electrodes, this space preferably varies between 5 and 500 microns, and even more preferably, this distance varies from 10 to 50 microns.

According to another preferred variant, said device is heated to temperatures varying from 25 to 100° C., preferably at 80° C. for 1 hour, in order to allow the cross-linking of the polymer present in the ternary or quaternary mixture.

According to another embodiment, said device contains a polymer membrane positioned between the two electrodes, and the SS mixture is introduced in the sealed electrochemical device.

So, preferably, a preparation process of a battery-type generator the anode of which is selected from the group constituted by the electrodes of the type lithium, lithium alloy, carbon, graphite, metal oxide and the cathode of $LiFePO_4$, $LiCoO_2$, $LiMn_2O_4$, $LiNiO_2$ and the mixtures of at least two of the latter are cited.

Such devices have revealed in particular a high yield at a low temperature.

So, it has been possible to prepare electrochemical devices the electrochemical yield at −20° C. of which corresponds to 80% of the electrochemical yield for the same device at room temperature.

An eighth object of the present invention is constituted by the electrochemical devices and by the electrochromic devices obtained by the implementation of one of the processes defined in the seventh object of the present invention.

Such electrochromic devices are characterized by a transparency over 80° C. in the bleached state and from 1-3% in the colored state and a good cyclability at room temperature.

A ninth object of the present application is constituted by the use of a ternary and/or quaternary mixture object of the invention or as obtained by one of the processes of the invention in one of the following applications: electrolyte for electrochemical system, preferably for electrochromic window and for electrochemical generator.

DESCRIPTION OF PREFERRED EMBODIMENTS OF THE INVENTION

The addition of molten salts to the mixture surprisingly increases the conductivity and safety performances of the electrochemical device. These properties are emphasized by the results reported in FIG. 1. This Figure shows the vapour pressure of the liquid electrolyte 1.5 M LiTFSI in EC+ GBL compared to that of each of the two molten salts, between 25 and 40° C. The liquid and the molten salts have a low vapour pressure, on the other hand at temperatures over 40° C., the liquid electrolyte has very high vapour pressures, which limits its application in the electrochromic field. On the other hand, molten salts have a low and almost constant vapour pressure depending on the temperature, which makes this type of molten salts safe for electrochromic windows.

The third constituent is a solvent which plays a role as a plasticizer and which is preferably found in solid form at room temperature, like ethylene carbonate (EC), or liquid form like propylene carbonate (PC), vinyl carbonate (VC), dimethylcarbonate (DMC), diethylcarbonate (DEC), Ethylmethylcarbonate (EMC) or the mixtures of at least two of the latter. To maintain the safety objective of the device, the boiling point must preferably be over 125° C.

The presence of these solvents in the mixture (PSS) plays a double role. The first role is to increase the ionic conductivity of the PSS, the second role is the optimization of the viscosity of the PSS mixture to facilitate coating on an electrode support in order to obtain a homogenous film.

The ternary and quaternary mixtures of the invention preferably present transparency over 80%, said transparency is measured using a UV-IR type near IR Variant brand device, a 2 mm thick mineral glass plate as reference of 100% transparency and a sample to measure constituted:

in the case where a cross-linkable polymer is present in the ternary or quaternary mixture, by a film, solid at room temperature, with a thickness comprised between 20 and 100 microns, wherein said film being obtained by coating and cross-linking of said ternary mixture; or in the case where no cross-linkable polymer is present in the ternary or quaternary mixture, by a gel film of the ternary mixture with a thickness comprised between 10 and 30 microns (preferably 20 to 30 microns), said gel being applied between two transparent glass plates.

1. Fabrication Process of the Electrolyte for Electrochromic Window

In the framework of the present invention, electrochromic window refers to an electrochemical system that changes colour reversibly by the application of a low voltage.

According to the invention, the fabrication of PSS-type electrolytes particularly adapted for the production of electrochromic windows may notably be carried out by the implementation of one of the methods clarified hereafter, coating is indifferently carried out by the implementation of one of the methods described in Coatings Technology Handbook, D. Gabas, pages 19 to 180. This document is incorporated by reference to the present application.

1-a Dry Membrane

A 4-branch polymer in liquid form at room temperature like Elexcel®TA-E210, commercialized by the DKS company, is used.

Figure 6:
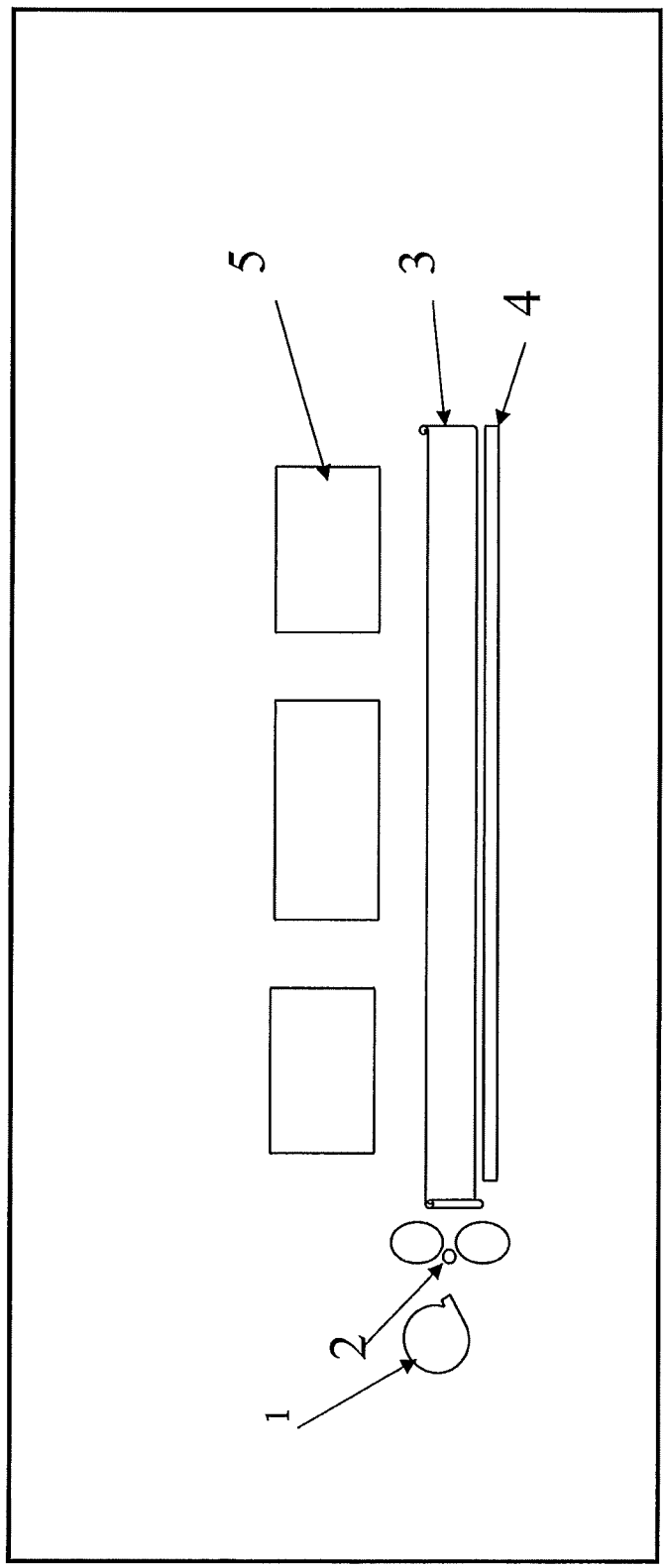
FIG. 6: illustrates the technique of PSS coating from a mixture prepared according to one of the methods illustrated in FIGS. 2 to 5, by using a coater with the Doctor Blade™ technique, the PSS is coated on a PP-type support.

Coating of the 4-branch polymer is carried out, with or without a lithium salt, using a coating device, working under controlled atmosphere, and modified for coating the salted membrane (FIG. 6). The membrane is coated on a PP (polypropylene) support, the thickness of the membrane is comprised between 15 and 20 microns.

Figure 7:
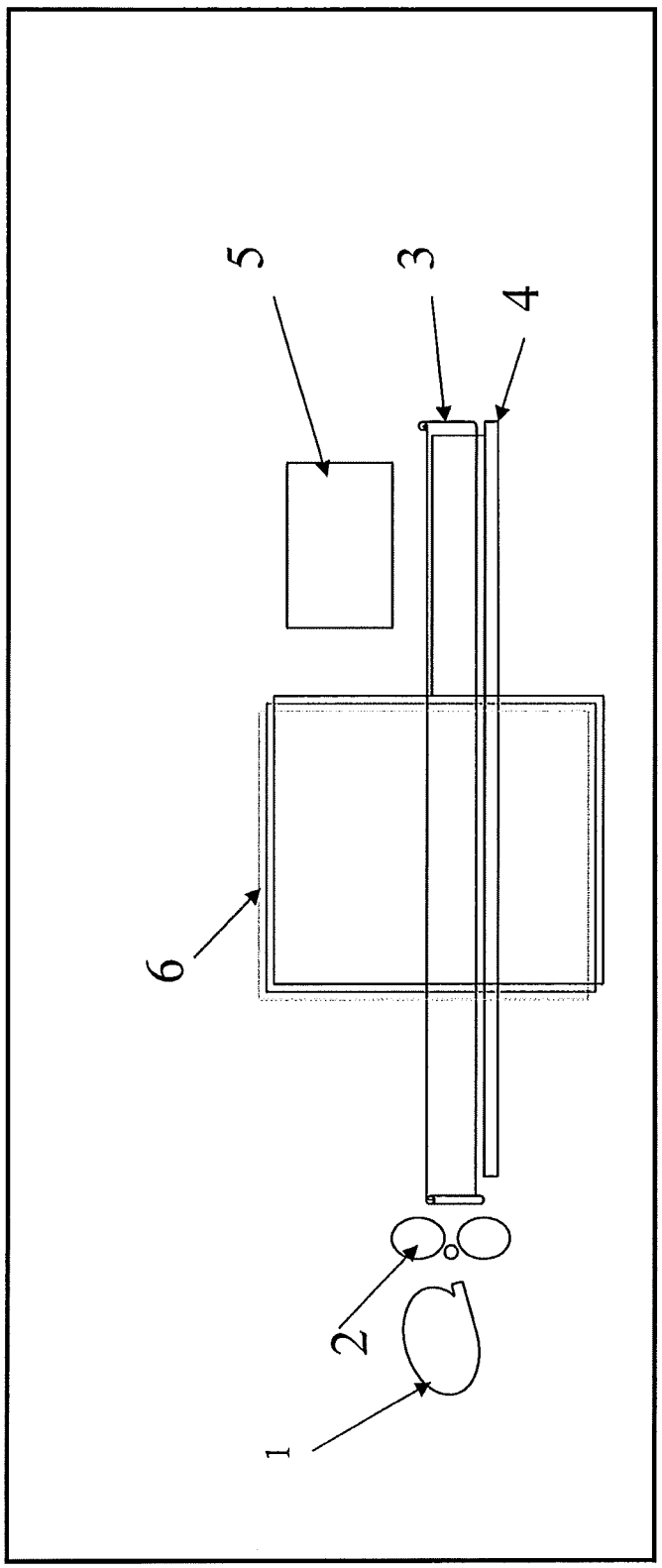
FIG. 7: illustrates the technique of coating the PSS from a mixture prepared according one of the methods illustrated in FIGS. 2 to 5, by using a coater with the Doctor Blade™ technique combined with an electron-beam machine for cross-linking (in this case it is not necessary to have an initiator), the PSS is coated on a PP-type support.
Figure 8:
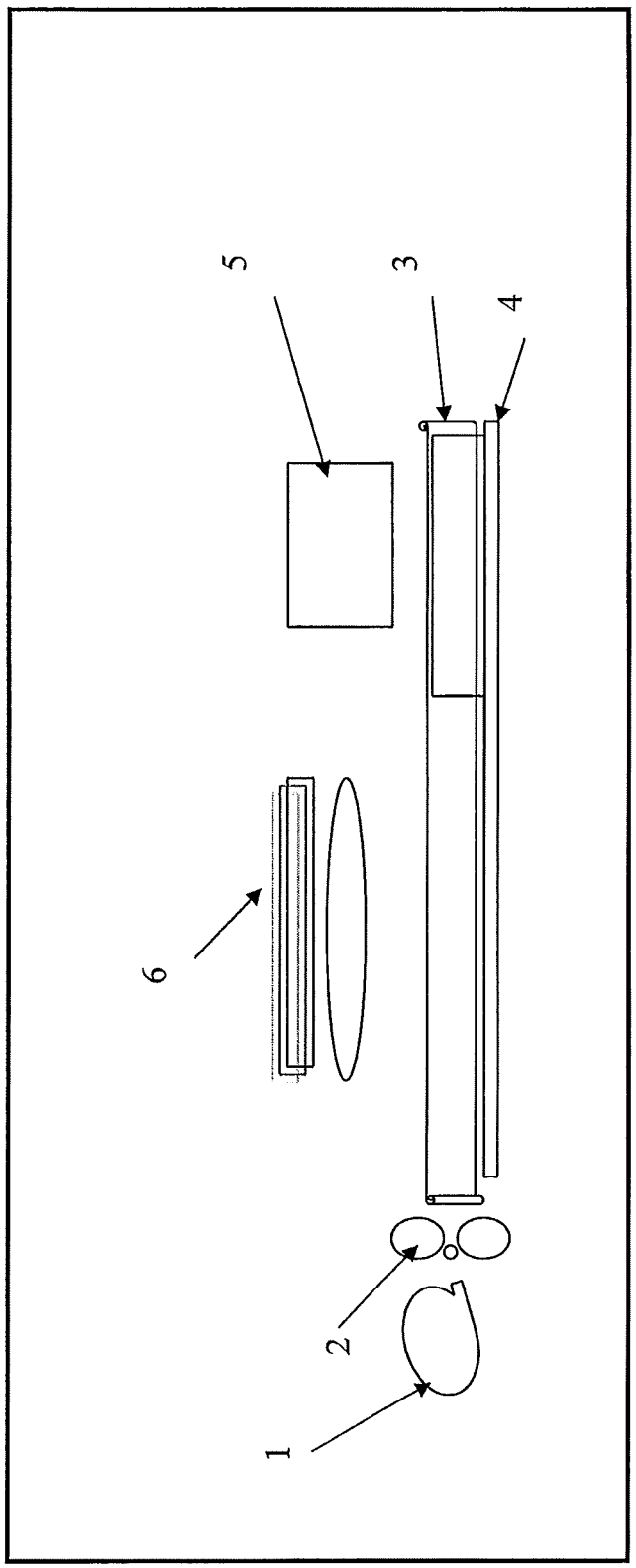
FIG. 8: illustrates the technique of coating the PSS from a mixture prepared according to one of the methods illustrated in FIGS. 2 to 5 and using a coater with the Doctor Blade™ technique combined with a UV lamp for cross-linking (in this case, a photo-initiator is added to the mixture), the PSS is coated on a PP-type support.
Figure 9:
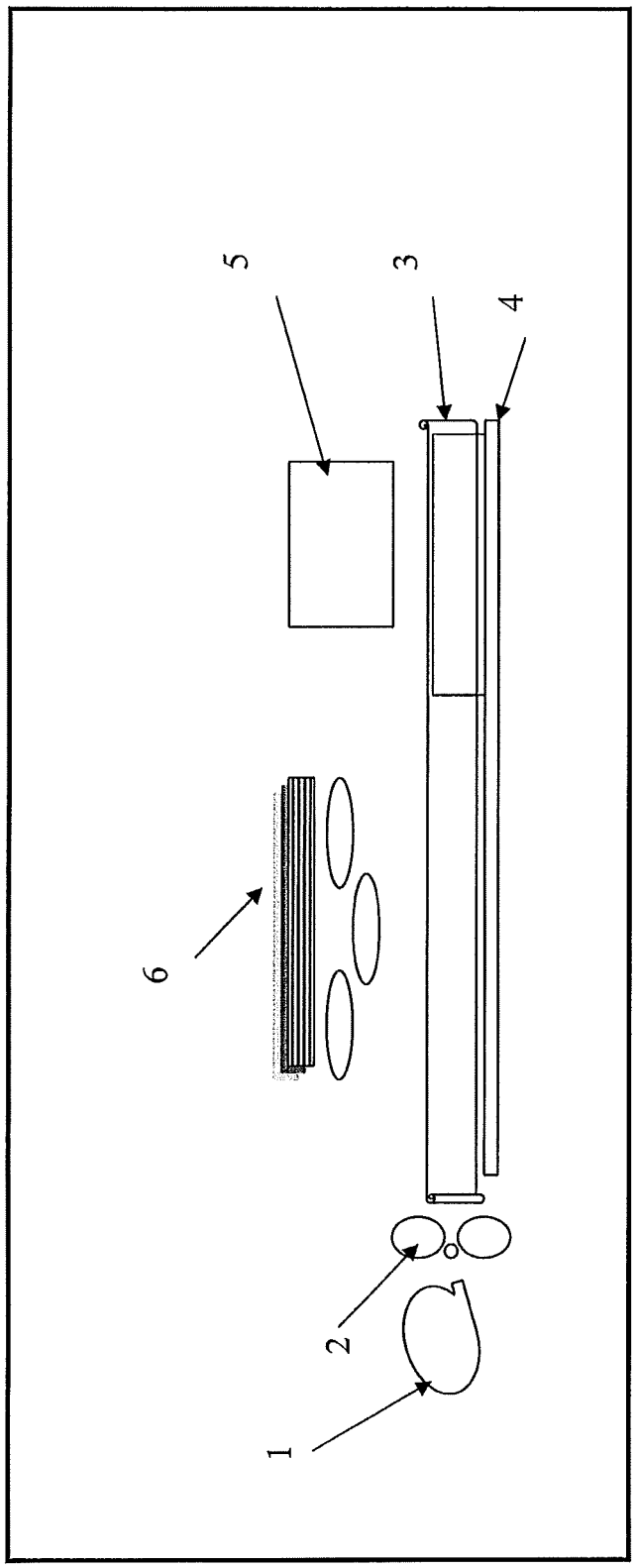
FIG. 9: illustrates the technique of coating the PSS from a mixture prepared according to one of the methods illustrated in FIGS. 2 to 5, by using a coater with the Doctor Blade™ technique combined with an IR lamp for cross-linking (in this case a thermo-initiator is added to the mixture), the PSS is coated on a PP-type support.

Once coating is completed, cross-linking is carried out in line by UV radiation as represented in FIG. 8, by Infrared as represented in FIG. 9 or by EBeam as represented in FIG. 7.

Cross-linking by Ultra-Violet is preferably carried out by the addition of a photo initiator-type or thermo initiator-type cross-linking agent under energy input preferably for about 5 seconds.

Thermal or infrared cross-linking is also carried out by the addition of a cross-linking agent.

In the case of a cross-linking by electron beam, it is not indispensable to add a cross-linking agent.

Once cross-linked, the dry membrane is soaked in a solution of molten salt and solvent (SS), The PSS electrolyte transferred by tethering to the PP support is then preferably deposited on one of the electrodes of any electrochemical device whatsoever such as an electrochromic window. The PP becomes easily detached from the PSS.

1-b Membrane Obtained from a Liquid Mixture

Figure 2:
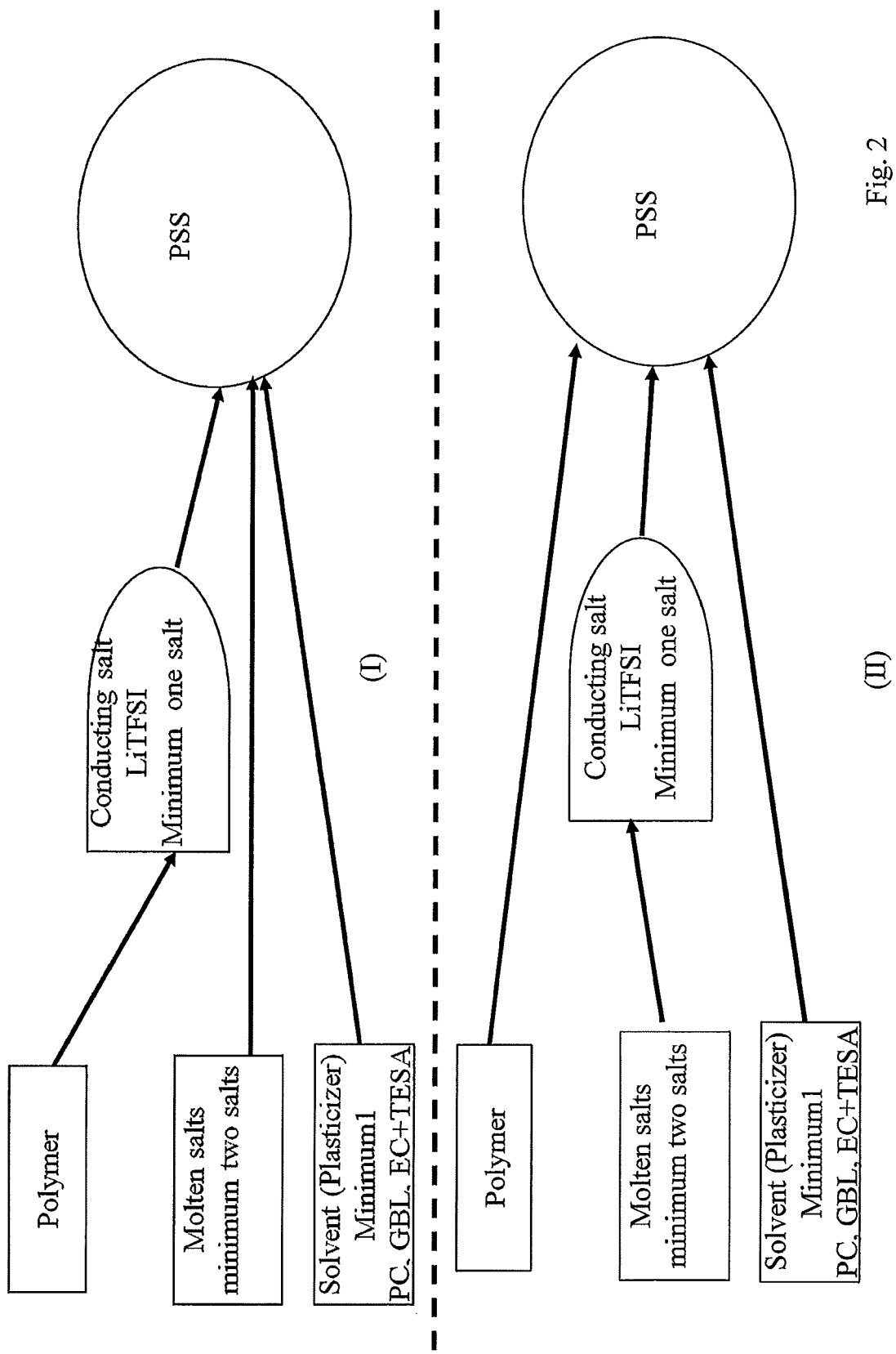
FIGS. 2 to 5: illustrate the different methods of fabricating PSS from a ternary mixture of polymer, molten salts and solvent (plasticizer) added to the lithium salt to have an ionic conductivity of which the polymer and/or the molten salt and/or the solvent (plasticizer) is/are salted.
Figure 3:
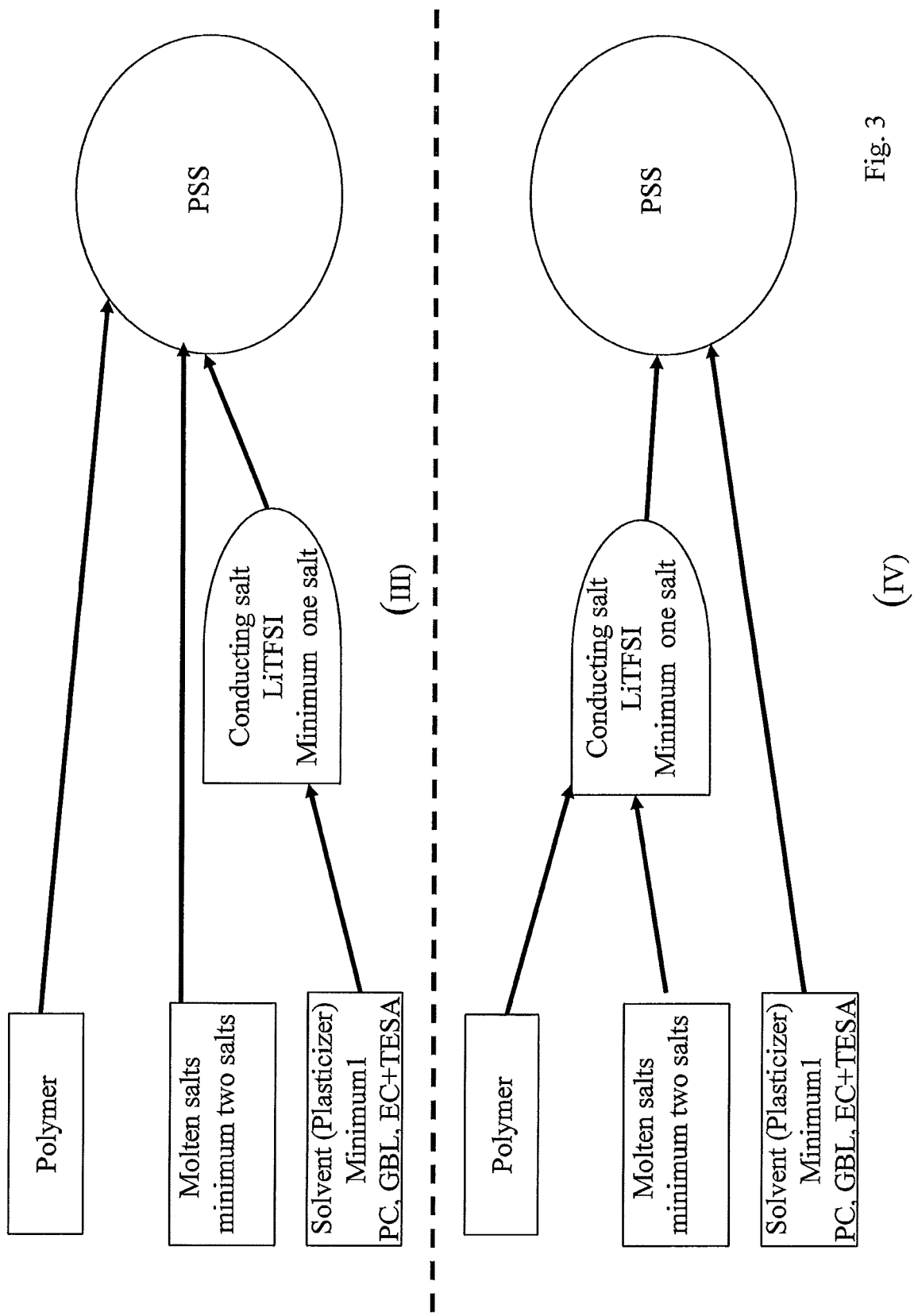
Figure 4:
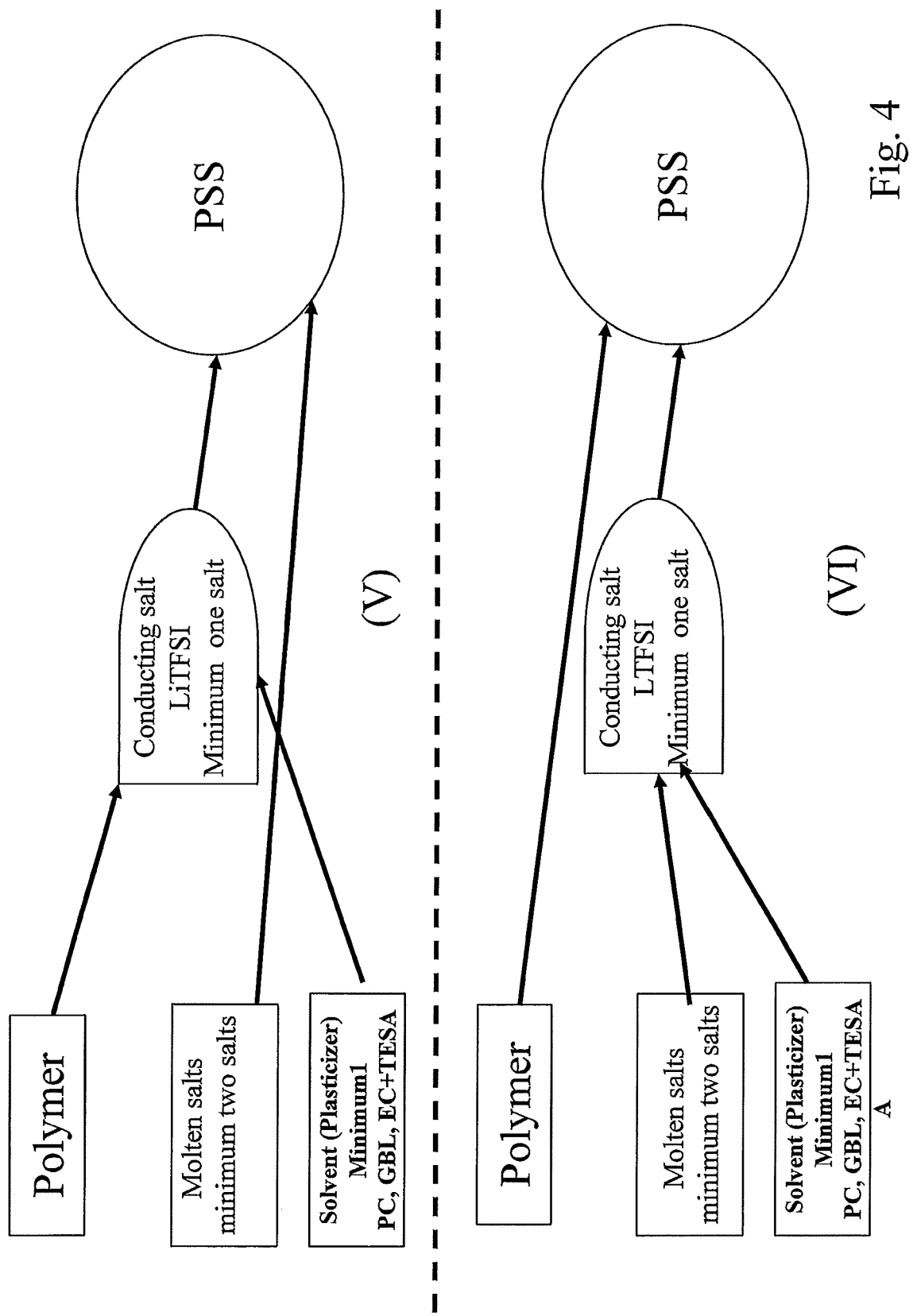
Figure 5:
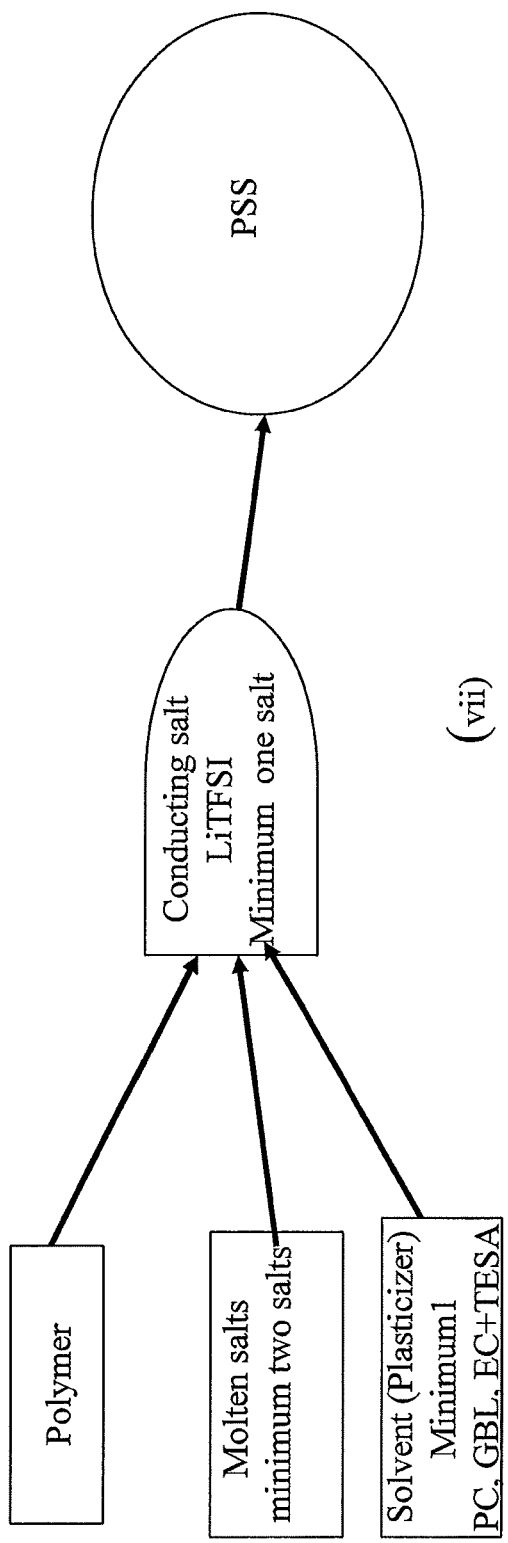

In this process, the 3 components, polymer, molten salt and solvent are mixed together in the presence of an initiator and according to the reactional sequences illustrated in FIGS. 2 and 5.

The mixture hereby obtained is coated on a PP support after cross-linking (UV or IR, or thermal or Ebeam). The PSS electrolyte is transferred and linked to an electrode of the electrochromic device.

2. Fabrication Process of Electrochemical Device

2a—with a Dry Membrane Soaked in a SS Mixture

Figure 11:
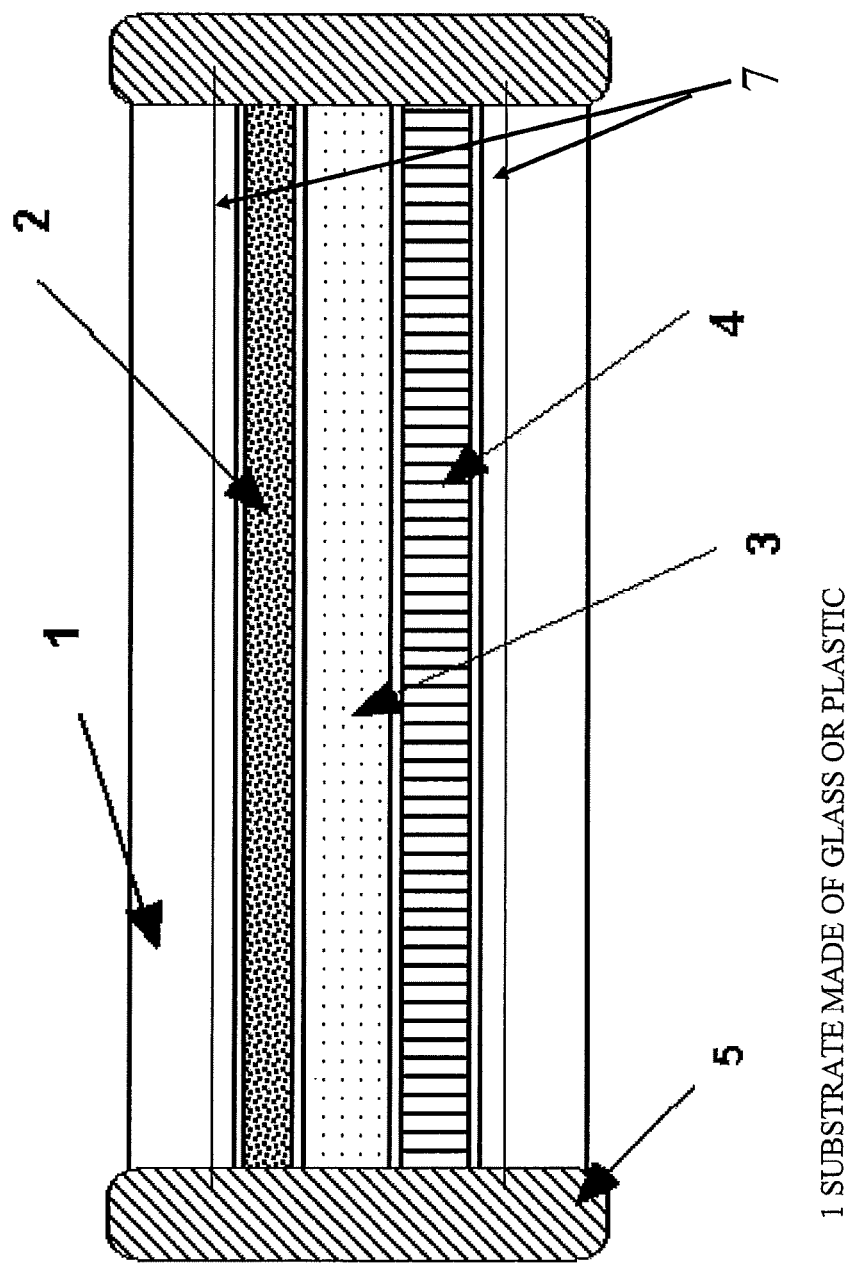
FIG. 11: illustrates the structure of an electrochromic window according to the invention constituted by a substrate made of glass or plastic (1), a transparent oxide film (2), a PSS film (3), a counter electrode (4) and a sealant (6).

FIG. 11 shows the scheme of an electrochromic device according to the invention. The PSS electrolyte is fixed on one of the electrodes, either ($Li_4Ti_5O_{12}$) or on the carbon-based electrode. This type of electrochromic technology functions in the same manner as a hybrid super capacitor described in the Hydro Quebec patent EP-A-1,339,642, this document is incorporated by reference.

The electrochemical reactions implemented during operation are the following:

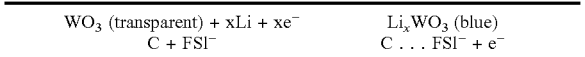

| $WO_3$ (transparent) + $xLi$ + $xe^-$ | $Li_xWO_3$ (blue) |
|---|---|
| $C + FSl^-$ | $C \ldots FSl^- + e^-$ |

2b—Assembly with the Dry Membrane

The dry membrane is abutted on one of the electrodes. After assembly, the device is sealed, an opening is left in the electrochromic cell in order to introduce the SS mixture.

Once the SS is introduced in the cell, the orifice is then sealed with a glue without vapour pressure such as Torr Seal.

2c—Assembly without Polymer Membrane

After sealing the device in FIG. 10, a situated orifice is left open in order to introduce the PSS mixture and the cross-linking agent. The distance of the void between the electrodes varies between 15 and 50 microns, after the introduction of the mixture through the opening, sealing the gap is very rapid using a sealant like Tor Seal.

The device is heated to 80° C. or exposed to the rays of an IR lamp for one hour. The electrolyte formed therein is transparent.

2d—by Coating the PSS on the Electrode

The SPP mixture is coated by the doctor Blade method or extrusion and abutted on the electrode and after deposited on the counter electrode. In the same manner, the PSS is overcoated on the counter electrode and after abutted on the working electrode.

After, the device is sealed.

EXAMPLES

The following examples are purely illustrative and may not be interpreted as constituent of any limitation whatsoever of the object of the present invention.

Example 1: Preparation of a Propylmethylimidazolium Molten Salt-Based Membrane 15 grams of 4-branch polymer (Elexcel®-PA-210 commercialized by DKS Japan) is mixed with 0.15 grams of the KTO46 type photoinitiator commercialized by the Sartomer company (Isacure). The mixture is coated on a 24 micron thick polypropylene (PP) support.

After 5 seconds under a UV lamp emitting 10 mW of energy, a 20 micron polymer film is obtained. The polymer film is vacuum dried for 24 hours.

This film is soaked for 5 minutes in a stainless steel recipient containing a solution of 20 grams of SS:molten salt (propylmethylimidazol+1M LiTFSl.) and solvent (VC:vinyl carbonate). The ratio of molten salt—solvent is 90:10 by weight.

The PP detaches naturally from the polymer membrane, a PSS1 membrane is formed.

This membrane is conductive to LiTFSl salt and its transparency measured according to the above defined method is over 80%.

Example 2: Preparation of a Propylmethylimidazolium Molten Salt Based Membrane Using a Thermal Initiator 15 grams of a 4-branch polymer (Elexcel®-PA-210 of DKS Japan) is mixed with 100 ppm of a Akzo® 16 type thermal initiator, the mixture is coated on a 24 micron thick PP support, then dried at 80° C. for one hour.

A 25 micron polymer film of cross-linked polymer is obtained. The polymer film is vacuum dried at 80° C. for 24 hours, then soaked for 5 minutes in a stainless steel recipient containing a solution of 20 grams of SS:molten salt (propylmethylimidazol+1M LiTFSl) and the solvent (GBL gamma-buterolactol).

The PP detaches naturally from the polymer membrane, a PSS2 membrane is formed. This membrane is conductive to LiTFSl salt and transparent in nature.

Its transparency measured according to the above measured method is over 80%.

Example 3: Preparation of a Propylmethylimidazolium Molten Salt Based Membrane by EBeam Cross-Linking 20 grams of 4-branch polymer (Elexcel®-A210 of DKS Japan) are homogenized then coated on a PP support passed over an electron beam machine for three minutes with an intensity of 5 Mrad.

A 25 micron polymer film of cross-linked polymer is obtained, this polymer film is vacuum dried at 80° C. for 24 hours, then soaked for 5 minutes in a stainless steel recipient containing a solution of 20 grams of SS:molten salt (propylmethylimidazol+1M LiTFSI) and the solvent (EC+GBL: ethylene carbonate+gamma-buterolactone). The ratio of molten salt-solvent is 90:10 by weight.

The PP detaches naturally from the polymer membrane, a PSS3 membrane is formed. This membrane is conductive to LiTFSl salt and transparent in nature. Its transparency is also over 80%.

Example 4: Preparation of a Hexylmethylimidazolium Molten Salt Based Salted Membrane 15 grams of 4-branch polymer (Elexcel®-A210 of DKS Japan) is mixed with 4.47 grams of LiTFSl and 0.15 grams of Perkadox® type photo initiator, the mixture is coated on a PP support.

After 5 seconds under a UV lamp emitting 10 mW of energy (positioning at a distance of 6 inches from the lamp), a 23 micron cross-linked polymer film is obtained.

The polymer film is vacuum dried at 80° C. for 24 hours, then soaked for 5 minutes in a stainless steel recipient in a solution of a mixture of 20 grams of SS:molten salt (hexylmethyllimidazolium) and the solvent (PC:propylene carbonate). The ratio of molten salt—solvent is 90:10 by weight.

The PP detaches naturally from the polymer membrane, a PSS4 membrane is formed. This membrane is conductive to LiTFSl salt and highly transparent, that is measured over 80%.

Example 5: Preparation of a Propylmethylimidazolium Molten Salt Based Membrane Directly from PSS1

In a button cell assembly, the PSS1 prepared in example 1 is abutted on a 18 mm-diameter lithium disk.

Figure 12:
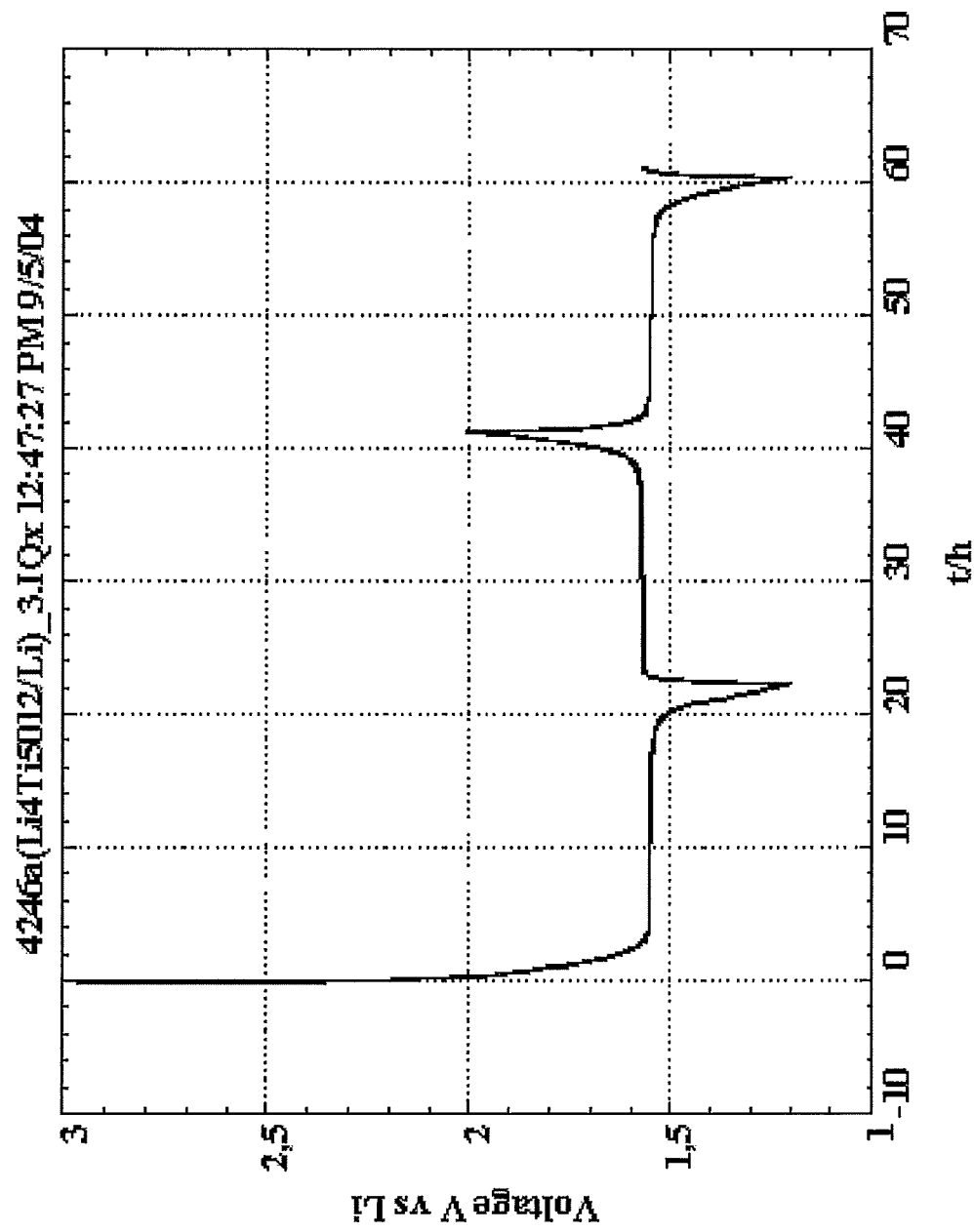
FIG. 12: illustrates the charge-discharge curve $Li_4Ti_5O_{12}$, in the presence of a film or a PSS membrane.

A 16 mm-diameter $Li_4Ti_5O_{12}$ type cathode is abutted on the PSS1, a Mac battery is used to charge and discharge the button cell at a current of C/24 (in 24 hours). FIG. 12 shows the two successive charge-discharge cycles, the capacity of $Li_4Ti_5O_{12}$ is 140 mAH/g, the reversibility of the cathode shows that the PSS1 membrane is electrochemically active owing to the lithium salt.

Example 6: Preparation of a Propylmethylimidazolium Molten Salt Based Membrane Directly from PSS2

In a button cell assembly, the PSS2 prepared in example 2 is abutted on a 18 mm-diameter lithium disk.

A 16 mm-diameter $Li_4Ti_5O_{12}$ type cathode is abutted on the PSS2, a Mac battery is used to charge and discharge the button cell at a current of C/24 (in 24 hours). The capacity of $Li_4Ti_5O_{12}$ is 143 mAh/g, the reversibility of the cathode shows that the PSS1 membrane is electrochemically active owing to the lithium salt.

Example 7 Preparation of a Hexylmethylimidazolium Molten Salt Based Membrane Directly from PSS3

In a button cell assembly, the PSS3 prepared in example 3 is abutted on a 18 mm-diameter lithium disk.

A 16 mm-diameter $Li_4Ti_5O_{12}$ type cathode is abutted on the PSS3, a Mac battery is used to charge and discharge the button cell at a current of C/24 (in 24 hours).

The capacity of $Li_4Ti_5O_{12}$ is 135 mAh/g, the reversibility of the cathode shows that the PSS3 membrane is electrochemically active owing to the lithium salt.

Example 8: Preparation of a Hexylmethylimidazolium Molten Salt Based Membrane Directly from PSS4

In a button cell assembly, the PSS4 prepared in example 4 is abutted on a 18 mm-diameter lithium disk.

A 16 mm-diameter $Li_4Ti_5O_{12}$ type cathode is abutted on the PSS4, a Mac battery is used to charge and discharge the button cell at a current of C/24 (in 24 hours).

The capacity of $Li_4Ti_5O_{12}$ is 141 mAh/g, the reversibility of the cathode shows that the PSS3 membrane is electrochemically active owing to the lithium salt.

Example 9: Preparation of a Hexylmethylimidazolium Molten Salt Based Membrane by In Situ Polymerization In a button cell assembly, 1 ml of the mixture of 4-branch polymer+molten salt (1M LiTFSl+emid)+VC in the proportion 10:80:10 by weight is introduced in a porous PP film that was abutted on 18 mm-diameter lithium, a $Li_4Ti_5O_{12}$ type cathode.

After sealing the button cell, it is introduced in an oven, the temperature of which is maintained at 80° C., for one hour, the button cell is removed from the chamber at 80° C. and is introduced in an incubator at 24° C.

A Mac battery is used to charge and discharge, at 25° C., the button cell has a current of C/24 (in 24 hours). The capacity of $Li_4Ti_5O_{12}$ is 132 mAh/g, the reversibility of the cathode shows that the PSS1 membrane is electrochemically active owing to the lithium salt.

Conclusion: the electrochromic windows of the invention prove to have excellent properties and notably in coloring/bleaching, stability and safety.

Although the present invention was described using specific implementations, it is understood that it is possible to add several variations and modifications to said implementations, and the present invention aims to cover such modifications, usages or adaptations of the present invention generally following the principles of the invention and including all variations of the present description that will become known or conventional in the field of activity in which the present invention is found, and that may apply to the essential above-mentioned elements in accordance with the scope of the following claims.

EMBODIMENTS

1. Aprotic polymeric ternary mixture-molten salt-solvent (PSS) ternary mixture, wherein the aprotic polymer is selected from the group constituted by aprotic polymers and mixtures of at least two of the latter, and by polymer mixtures including at least 20% by weight of an aprotic polymer.

2. Ternary mixture according to embodiment 1, homogenous and liquid at room temperature, wherein the aprotic polymer preferably has a mean molecular weight (MW) between 1,000 and 1,000,000, even more preferably between 5,000 and 100,000.

3. Ternary mixture according to embodiment 1 or 2, presenting a transparency over 80%, wherein said transparency being measured using a UV-IR type near IR. Variant brand device, a 2 mm thick mineral glass plate as reference of 100% transparency and a sample to measure constituted: in the case where a cross-linkable aprotic polymer is present in the ternary mixture, by a solid room temperature film with a thickness ranging from 20 to 100 microns, wherein said film being obtained by coating and cross-linking of said ternary mixture; or in the case where no cross-linkable aprotic polymer is present in the ternary mixture, by a gel film of the ternary mixture, with a thickness ranging from 10 to 30 microns (preferably varying from 20 to 30 microns), wherein said gel being applied between two transparent glass plates.

4. Ternary mixture according to embodiment 3, presenting a transparency over 90%.

5. Ternary mixture according to any one of embodiments 1 to 4, wherein the aprotic polymer is cross-linkable.

6. Ternary mixture according to embodiment 5, wherein the polymer presents a percentage of cross-linkable bonds over 80%.

7. Ternary mixture according to embodiment 6 wherein the percentage of cross-linking is comprised between 5 and 50%.

8. Ternary mixture according to embodiment 7, wherein the percentage of cross-linkable bonds is comprised between 10 and 30%.

9. Ternary mixture according to any one of embodiments 5 to 8, wherein the cross-linkable polymer is selected from the group constituted by the polymers of the type 3-branch polyether, 4-branch polyether, GE vinyl and by the mixtures of at least two of these polymers.

10. Ternary mixture according to any one of embodiments 1 to 4, wherein the polymer is non-cross-linkable.

11. Ternary mixture according to embodiment 10, wherein the non-cross-linkable aprotic polymer is selected from the group constituted by the polymers of the type polyvinyldienefluoride (PVDF) and poly(methylmetacrylate) PMMA, and by the mixtures of at least two of the latter.

12. Ternary mixture according to any one of embodiments 1 to 4, wherein the aprotic polymer is constituted by a mixture of at least one cross-linkable polymer and at least one non cross-linkable polymer; preferably for electrochemical systems, the ratio of cross¬linkable polymer to non-cross-linkable polymer is about 50:50 while in the case of electrochromic windows this ratio is about 80:20.

13. Ternary mixture according to embodiment 12, wherein the polymer mixture, cross¬linkable polymer includes at least one PMMA.

14. Ternary mixture according to any one of embodiments 1 to 13, wherein the molten salt present in the ternary mixture is selected amongst those melted at a temperature comprised between −40 and 350° C.

15. Ternary mixture according to embodiment 14, wherein the molten salt present in the ternary mixture is selected amongst those melted at a temperature comprised between −20 and 60° C.

16. Ternary mixture according to any one of embodiments 1 to 15, containing at least two salts selected from the group constituted by imidazolium, imidinium, pyridinium, ammonium, pyrolium, sulfonium and phosphonium salts and by the mixtures of at least two of the latter.

17. Ternary mixture according to embodiment 16, wherein the molten salts are selected from the group constituted by the soluble hydrophobic salts described in embodiment 16, as well as by the mixtures of at least two of the latter.

18. Ternary mixture according to any one of embodiments 1 to 17, wherein the solvent present in the ternary mixture is selected from the group constituted by organic solvents, preferably amongst those of the group constituted by the solvents of the type EC, PC, DMC, DEC, EMC, GBL, VC, VB and by the mixtures of at least two of the latter.

19. Ternary mixture according to any one of embodiments 1 to 17, wherein the solvent present in the ternary mixture is selected from the group constituted by inorganic solvents, preferably such as KOH, NaOH and by the mixtures of at least two of the latter.

20. Ternary mixture according to any one of embodiments 1 to 17, constituted by a mixture of organic and inorganic solvent, preferably by a mixture of solvents defined in embodiments 18 and 19.

21. Ternary mixture according to embodiment 18, wherein the solvent is of the organic type and presents a boiling point over 125° C. in standard temperature and pressure conditions.

22. Ternary mixture according to any one of embodiments 1 to 21, containing by weight:
a. from 1 to 98%, preferably from 5 to 70 mole percent of aprotic polymer;
b. from 1 to 98%, preferably from 5 to 70 mole percent of molten salt; and
c. from 1 to 98%, preferably from 7 to 70 mole percent of solvent, the total weight of the constituents of the ternary mixture being equal to 100%

23. Ternary mixture according to embodiment 22, characterized by a viscosity varying from 1 to 5000 cP, more preferably from 5 to 500 cP.

24. Quaternary mixture comprising a ternary mixture according to any one of embodiments 1 to 23 and an ion-conducting salt, said ion-conducting salt is preferably selected from the group constituted by alkaline earth salts, preferably from the group of lithium salts.

25. Quaternary mixture according to embodiment 24, in the lithium salts retained are of the type LiTFSI, LiFSI, LiBOB, LiDCTA, LiClO$_4$, LiCF$_3$SO$_3$, LiPF$_6$, LiBF$_4$, LiI and by the mixtures of at least two of the latter.

26. Quaternary mixture according to embodiment 24 or 25, wherein the concentration of conducting salt varies from 0.01 to 3M (M:molar).

27. Quaternary mixture according to embodiment 26, wherein the concentration of conducting salt varies from 0.5 M to 2.5 M.

28. Quaternary mixture according to any one of embodiments 5 to 9, wherein the aprotic polymer is cross-linkable by any one of the following methods: UV, IR, thermal and Ebeam.

29. Quaternary mixture according to any one of embodiments 24 to 28, containing by weight:
a. from 1 to 98%, preferably from 5 to 70 mole percent of polymer;
b. from 1 to 98%, preferably from 5 to 70 mole percent of molten salt;
c. from 1 to 98%, preferably from 7 to 70 mole percent of solvent; and
d. from 1 to 98%, preferably from 7 to 70 mole percent of ion conducting salt,
the total weight of the constituents of the quaternary mixture being equal to 100%.

30. Quaternary mixture according to any one of embodiments 24 to 29, characterized by a viscosity varying from 1 to 5,000 cP, even more preferably from 5 to 500 cP.

31. Ternary mixture according to any one of embodiments 1 to 23, or quaternary mixture according to any one of embodiments 24 to 30, wherein the aprotic polymer is cross-linkable by at least one of the following methods: UV, IR, thermal, Ebeam.

32. Preparation process of a ternary mixture according to any one of embodiments 1 to 23 and 31 and 27 or of a quaternary mixture according to any one of embodiments 24 to 31, by the mixture, in an indifferent order, of the constituents of said ternary or quaternary mixture.

33. Preparation process of a ternary mixture or a quaternary mixture according to embodiment 32, in one step and preferably at room temperature, at a controlled pressure and under inert atmosphere.

34. Preparation process of a membrane from a ternary mixture as defined in any one of embodiments 1 to 23 and 31 and/or a quaternary mixture according to any one of embodiments 24 to 31, and/or from a ternary or quaternary mixture as prepared by implementation of one of the processes defined in any one of embodiments 32 and 33.

35. Preparation process of an electrochemical membrane according to embodiment 34, wherein the polymer membrane is of the non-salted type, abutted against one of the electrodes, and it is soaked in a salted SS (solvent-molten salt) mixture after abutment against one of the electrodes.

36. Preparation process of an electrochemical membrane according to embodiment 34, wherein the polymer membrane is of the non-salted type, abutted against one of the electrodes, and it is soaked in a non-salted SS mixture after abutment against one of the electrodes.

37. Preparation process of an electrochemical membrane according to embodiment 34, wherein the polymer membrane is of the salted type, abutted against one of the electrodes, and it is soaked in a salted SS mixture after abutment against one of the electrodes.

38. Preparation process of an electrochemical membrane according to embodiment 34, wherein the salted polymer membrane is abutted against one of the electrodes and is soaked in a non-salted SS mixture after abutment against one of the electrodes.

39. Preparation process of an electrochemical membrane according to any one of embodiments 34 to 38, wherein the ion-conducting salt is dissolved in the molten salt.

40. Preparation process of an electrochemical membrane according to any one of embodiments 34 to 39, wherein the ion-conducting salt is dissolved in the solvent.

41. Preparation process of an electrochemical membrane according to any one of embodiments 34 to 41, wherein the membrane is abutted against the electrode and adheres to it.

42. Preparation process of an electrochemical system comprising at least two electrodes and at least one electrolyte constituted from a PSS ternary mixture and/or from a PSSS mixture according to the invention.

43. Preparation process of an electrochemical system comprising at least one electrode, at least one cathode, at least one electrolyte (PSS).

44. Preparation process of an electrochemical system as represented in FIG. 10 which represents a prototype of an electrochromic window.

45. Preparation process of an electrochemical system according to embodiment 44, said electrochemical system comprising at least one intercalation electrode and at least one double layer electrode.

46. Preparation process of an electrochemical system according to any one of embodiments 42 to 45, wherein the ternary mixture is constituted by the 4-branch polymer Elexce10-PA-210, molten salt (propylmethylimidazol+1M LiTFSI.) and solvent (VC:vinyl carbonate).

47. Preparation process of an electrochemical device, preferably of an electrochromic system comprising:
a solid transparent substrate, preferably made of a glass or plastic substrate; a transparent oxide film;
a PSS and/or PSSS film;
a counter electrode; and
a sealer
by implementing the following steps:
preparation of a solid transparent substrate, preferably made of glass or plastic, having a transparent conducting layer;
preparation of a transparent and conducting oxide based cathode;
preparation of a PSS-type and/or PSSS-type transparent electrolyte presenting a transparency preferably over 80%;
preparation of an anode (counter electrode) based on a transparent oxide, on a conducting polymer or on a carbon on a solid transparent substrate, preferably made of glass or plastic, having a transparent conducting layer;
assembly of the hereinbefore prepared elements; and
sealing of the extremities (perimeters) of the substrates with a sealer selected preferably from the group constituted by glues commercialized under the Variant society Torr-Seal low vapour pressure resin trademark.

48. Process according to embodiment 47, for preparing an electrochromic window with a transparent electrolyte of the PSS type presenting a transparency preferably over 80%.

49. Preparation process of an electrochromic device according to embodiment 47 or 48, wherein a ternary or quaternary mixture as defined in any one of embodiments 1 to 31 is coated on one of the electrodes and after abutment on the other electrode.

50. Preparation process of an electrochromic device according to any one of embodiments 47 to 49, wherein the cathode is based on a metal oxide selected from the group constituted by: $WO_3$, $MoO_3$, $V_2O_5$, $Li_4Ti_5O_{12}$ and electronic conducting polymer and by the mixtures of at least two of the latter.

51. Preparation process of an electrochromic device according to any one of embodiments 47 to 49, wherein the anode is based on a metal oxide selected from the group constituted by: $IrO_x$, $LiVO_x$, $NiO_x$, $NiO_xH_y$ (with x comprised between 00.1 and 0.2), $Ta_2O_5$, $Sb_2O_5$, the electrically conducting polymers and by the mixtures of at least two of the latter.

52. Preparation process of an electrochromic device according to any one of embodiments 47 to 51, wherein the PSS mixture is introduced into the device at the level of the space separating the two electrodes, this space corresponding to a distance between electrodes varying between 5 and 500 microns, even more preferably between 10 and 50 microns.

53. Preparation process of an electrochromic device according to embodiment 52, wherein said device is heated to temperatures varying from 25 to 100° C., preferably at 80° C. for 1 hour to allow the cross-linking of the polymer.

54. Preparation process of an electrochromic device according to embodiment 51 or 52, wherein said device contains a polymer membrane between the two electrodes and the SS mixture is introduced into the sealed electrochemical device.

55. Electrochromic device obtained by implementation of a process as defined in any one of embodiments 47 to 54.

56. Electrochemical device characterized by a high yield at low temperature.

57. Electrochemical device characterized by a yield at −20° C. corresponding to at least 80% of the electrochemical yield obtained for the same device at room temperature.

58. Preparation process of an electrochemical device according to embodiment 47, applied to the preparation of a battery-type generator the anode of which is selected from the group constituted by the electrodes of the type lithium, lithium alloy, carbon, graphite and metal oxide and the cathode of $LiFePO_4$, $LiCoO_2$, $LiMn_2O_4$, $LiNiO_2$, $LiMn_{1/3}CO_{2/3}Ni_{1/3}O_2$, and by the mixtures of at least two of the latter.

59. Use of a ternary or quaternary mixture as defined in any one of embodiments 1 to 31 or as obtained by implementation of one of the processes defined in embodiments 32 and 33 in one of the following applications:
electrolyte for electrochemical system preferably for electrochromic window, and electrochemical generator.

60. Electrochemical systems obtained by implementation of one of processes 42 to 46.

The invention claimed is:

1. A composition comprising:
   a cross-linkable aprotic polymer capable of forming a film, said polymer being a three-branched polyether, a four-branched polyether, a copolymer of ethylene oxide-2,3-epoxy-1-propanol, or a mixture thereof;
   a molten salt constituted by an organic cation salt which is imidazolium, imidinium, pyridinium, ammonium, pyrolium, sulfonium, phosphonium, or a mixture thereof;
   an organic solvent having a boiling point higher than 125° C. under standard conditions of temperature and pressure, said organic solvent being ethylene carbonate (EC), propylene carbonate (PC), di-methyl-carbonate (DMC), diethyl-carbonate (DEC), ethyl-methyl-carbonate (EMC), γ-butyrolactone (GBL), vinyl carbonate (VC), vinyl butyrate (VB), or a mixture thereof; and
   optionally an ionic conducting salt,
   wherein the composition comprises at least 20% by weight of the cross-linkable aprotic polymer, and
   wherein the composition does not comprise a polymer comprising polyvinylidene fluoride or poly(methylmethacrylate).

2. The composition according to claim 1, wherein the composition is homogeneous and liquid at ambient temperature.

3. The composition according to claim 1, wherein the cross-linkable aprotic polymer has a mean molecular weight of 1,000 to 1,000,000.

4. The composition according to claim 1, wherein the composition has a transparency greater than 80%, said transparency being measured using equipment of Variant trademark and of UV-IR near IR type, a mineral glass plate of 2 mm thickness as 100% transparency reference and a sample to be measured that is solid at ambient temperature and has a thickness of 20 to 100 microns, said sample being in film form obtained by blade coating and cross-linking said composition.

5. The composition according to claim 4, wherein the composition has a transparency greater than 90%.

6. The composition according to claim 1, wherein the cross-linkable aprotic polymer has a percentage of cross-linkable bonds greater than 80%.

7. The composition according to claim 1, wherein the cross-linkable aprotic polymer has a percentage of cross-linkable bonds between 5 and 50%.

8. The composition according to claim 1, wherein the cross-linkable aprotic polymer has a percentage of cross-linkable bonds between 10 and 30%.

9. The composition according to claim 1, wherein the molten salt is a salt which melts at a temperature between −40 and 350° C.

10. The composition according to claim 1, wherein the molten salt is a salt which melts at a temperature between −20 and 60° C.

11. The composition according to claim 1, wherein the molten salt is a mixture of at least two molten salts.

12. The composition according to claim 1, wherein the cross-linkable aprotic polymer is cross-linked by at least one of the following methods: UV, IR, thermal and Ebeam.

13. The composition according to claim 1, comprising:
   from 5 to 70 molar % of the cross-linkable aprotic polymer;
   from 5 to 70 molar % of the molten salt; and
   from 7 to 70 molar % of the organic solvent,
   wherein the total sum in mole of constituents is 100%.

14. The composition according to claim 13, wherein the composition has a viscosity between 1 and 5000 cP.

15. The composition according to claim 1, further comprising the ionic conducting salt.

16. The composition according to claim 15, wherein the ionic conducting salt is a lithium salt that is lithium bis(fluorosulfonyl)imide (LiFSI), lithium bis(trifluoromethylsulfonyl)imide (LiTFSI), lithium bis(oxalato)borate (LiBOB), lithium dicyanotriazole (LiDCTA), lithium perchlorate ($LiClO_4$), lithium trifluoromethanesulfonate ($LiCF_3SO_3$), lithium hexafluorophosphate ($LiPF_6$), lithium tetrafluoroborate ($LiBF_4$), lithium iodide (LiI), or a mixture thereof.

17. The composition according to claim 15, wherein a concentration of the ionic conducting salt is from 0.01 to 3 M.

18. The composition according to claim 15, wherein a concentration of the ionic conducting salt is from 0.5 to 2.5 M.

19. The composition according to claim 15, comprising:
   from 5 to 70 molar % of the cross-linkable aprotic polymer;
   from 5 to 70 molar % of the molten salt;
   from 7 to 70 molar % of the organic solvent;
   from 7 to 70 molar % of the ionic conducting salt,
   wherein the total sum in mole of constituents is 100%.

20. The composition according to claim 19, wherein the composition has a viscosity between 1 and 5000 cP.

21. A composition consisting of:
   a cross-linkable aprotic polymer capable of forming a film, said polymer being a three-branched polyether, a four-branched polyether, or a copolymer of ethylene oxide-2,3-epoxy-1-propanol;
   a molten salt constituted by an organic cation salt which is imidazolium, imidinium, pyridinium, ammonium, pyrolium, sulfonium, phosphonium, or a mixture thereof;
   an organic solvent having a boiling point higher than 125° C. under standard conditions of temperature and pressure, said organic solvent being ethylene carbonate (EC), propylene carbonate (PC), di-methyl-carbonate (DMC), diethyl-carbonate (DEC), ethyl-methyl-carbonate (EMC), γ-butyrolactone (GBL), vinyl carbonate (VC), vinyl butyrate (VB), or a mixture thereof; and
   optionally an ionic conducting salt,
   wherein the composition comprises at least 20% by weight of the cross-linkable aprotic polymer.

22. The composition according to claim 21, wherein the cross-linkable aprotic polymer capable of forming a film is a four-branched polyether.

* * * * *